(12) United States Patent
Ito

(10) Patent No.: US 10,399,471 B2
(45) Date of Patent: Sep. 3, 2019

(54) VEHICLE SEAT WITH PAD HAVING A THROUGH-OPENING FOR HARNESS

(71) Applicant: TS TECH CO., LTD., Asaka-shi, Saitama (JP)

(72) Inventor: Teppei Ito, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 15/656,651

(22) Filed: Jul. 21, 2017

(65) Prior Publication Data
US 2017/0320417 A1 Nov. 9, 2017

Related U.S. Application Data

(63) Continuation of application No. 14/442,322, filed as application No. PCT/JP2013/080857 on Nov. 15, 2013, now Pat. No. 9,738,193.

(30) Foreign Application Priority Data

Nov. 16, 2012 (JP) .................. 2012-252360
Nov. 16, 2012 (JP) .................. 2012-252370
Nov. 16, 2012 (JP) .................. 2012-252374

(51) Int. Cl.
*B60N 2/68* (2006.01)
*B60N 2/70* (2006.01)
(Continued)

(52) U.S. Cl.
CPC ............... *B60N 2/68* (2013.01); *B60N 2/002* (2013.01); *B60N 2/1615* (2013.01);
(Continued)

(58) Field of Classification Search
CPC ...... B60N 2/7094; B60N 2/7047; B60N 2/58; B60N 2/68; B60N 2/72
(Continued)

(56) References Cited

U.S. PATENT DOCUMENTS 2,241,909 A 5/1941 Hoven et al.
3,034,829 A 5/1962 Flint
(Continued)

FOREIGN PATENT DOCUMENTS

CN 102469881 A 5/2012
CN 102654585 A 9/2012
(Continued)

OTHER PUBLICATIONS

International Search Report issued in PCT/JP2013/080857 (dated Feb. 10, 2014).
(Continued)

*Primary Examiner* — Milton Nelson, Jr.
(74) *Attorney, Agent, or Firm* — Hamre, Schumann, Mueller & Larson, P.C.

(57) ABSTRACT

A vehicle seat includes right and left side frames 10, and an elastic member (cushion spring 20) run between the right and left side frames 10. The right and left side frames 10 include side walls 11 disposed opposite to each other in a lateral direction, and flange portions (upper flange portions 12) respectively extending laterally inward from the side walls 11, and the elastic member is attached to the flange portions.

20 Claims, 15 Drawing Sheets

(51) Int. Cl.
  *B60N 2/72* (2006.01)
  *B60N 2/16* (2006.01)
  *B60N 2/00* (2006.01)
  *B60N 2/60* (2006.01)
(52) U.S. Cl.
  CPC ......... *B60N 2/1675* (2013.01); *B60N 2/6009* (2013.01); *B60N 2/7047* (2013.01); *B60N 2/7094* (2013.01); *B60N 2/72* (2013.01)
(58) Field of Classification Search
  USPC ........................................ 297/452.22, 452.52
  See application file for complete search history.

(56) References Cited

U.S. PATENT DOCUMENTS

| | | | |
|---|---|---|---|
| 3,386,725 | A | 6/1968 | Koichi |
| 3,628,780 | A | 12/1971 | Saito |
| 3,639,002 | A | 2/1972 | Tischler |
| 5,074,534 | A | 12/1991 | Hoshino |
| 5,226,188 | A * | 7/1993 | Liou ...................... A47C 7/742 297/452.46 |
| 6,663,178 | B2 * | 12/2003 | Fourrey ................... A47C 7/14 297/284.3 |
| 7,063,390 | B2 | 6/2006 | Suzuki et al. |
| 8,752,901 | B2 | 6/2014 | Kawano et al. |
| 2007/0063570 | A1 | 3/2007 | Yoshida |
| 2009/0108646 | A1 | 4/2009 | Chida et al. |
| 2012/0126606 | A1 | 5/2012 | Takakura et al. |
| 2012/0274529 | A1 | 11/2012 | Yoshino et al. |
| 2013/0193296 | A1 | 8/2013 | Hoshi et al. |
| 2013/0200677 | A1 | 8/2013 | Hoshi et al. |
| 2013/0214576 | A1 | 8/2013 | Hoshi et al. |
| 2014/0021769 | A1 | 1/2014 | Sugiyama |

FOREIGN PATENT DOCUMENTS

| | | |
|---|---|---|
| EP | 1179308 A1 | 2/2002 |
| EP | 2517927 A1 | 10/2012 |
| JP | S44-30900 Y1 | 12/1969 |
| JP | S54-41769 B2 | 12/1979 |
| JP | S5759015 Y2 | 12/1982 |
| JP | 58-1361 | 1/1983 |
| JP | H3-35749 U | 4/1991 |
| JP | 2000-308544 A | 11/2000 |
| JP | 2002-66174 A | 3/2002 |
| JP | 2006-182039 A | 7/2006 |
| JP | 2008-80904 A | 4/2008 |
| JP | 2009208495 A | 9/2009 |
| JP | 2010-167022 A | 8/2010 |
| JP | 2010259685 A | 11/2010 |
| JP | 2011-230588 A | 11/2011 |
| JP | 2012140064 A | 7/2012 |
| WO | 2011/016532 A1 | 2/2011 |
| WO | 2012049725 A1 | 4/2012 |
| WO | 2012133675 A1 | 10/2012 |

OTHER PUBLICATIONS

Office Action issued for Chinese application No. 201380059966.6, dated Jul. 5, 2016, 17 pages including English translation.
Partial European Search Report for European application No. 13854475.4, dated Jul. 4, 2016, 6 pages.
Office Action issued for Japanese patent application No. 2012-252360, dated Aug. 9, 2016, 7 pages including English translation.
Office Action issued for Japanese patent application No. 2012-252370, dated Aug. 9, 2016, 5 pages including English translation.
Office Action issued for Japanese patent application No. 2012-252374, dated Aug. 9, 2016, 6 pages including English translation.
Office Action issued for Japanese patent application No. 2012-252374, dated Nov. 1, 2016, 7 pages including English translation.
Office Action issued for counterpart Chinese Patent Application No. 201380059966.6, dated Mar. 1, 2017, 24 pages including English translation.
Office Action issued for Indian Patent Application No. 3362/CHENP/2015, dated Jun. 11, 2019, 6 pages.

* cited by examiner (a)

(b)

VEHICLE SEAT WITH PAD HAVING A THROUGH-OPENING FOR HARNESS

TECHNICAL FIELD

The present invention relates to a vehicle seat.

BACKGROUND ART

Conventionally, there is known a vehicle seat including right and left side frames and a cushion spring run between the right and left side frames (for example, Japanese Laid-open Patent Application, Publication No. 2010-167022). To be more specific, in this technique, the cushion spring is attached to side walls, which are opposite to each other in the lateral direction, of the right and left side frames.

SUMMARY OF THE INVENTION

However, there are drawbacks in the above technique that no structural object can be disposed between the side walls because the cushion spring is attached to the side walls and that the shape of the side walls cannot be determined as desired.

In view of the above, a first object of the present invention is to provide a vehicle seat, in which a structural object can be disposed between the side walls of the side frames to which the cushion spring (elastic member) is attached, and in which the shape of the side walls can be determined as desired.

Further, the present invention seeks to suppress deformation of a portion to which the cushion spring is attached. The present invention also seeks to favorably support an occupant by the cushion spring.

Further, the present invention seeks to effectively utilize a space between the cushion spring and the side frames. The present invention also seeks to prevent the cushion spring from interfering with a part provided in the vicinity of the side frames when the cushion spring is attached to the side frames.

Further, the present invention seeks to favorably keep the engagement between the cushion spring and the side frames. The present invention also seeks to facilitate the work for attaching the cushion spring to the side frames.

Further, the present invention seeks to cause the side frames to favorably receive a load from the cushion spring. The present invention also seeks to downsize the vehicle seat in the upper-lower direction.

Further, the present invention seeks to enhance the rigidity of a portion of the side frame to which the cushion spring is engaged.

Conventionally, there is also known a vehicle seat including a seat cushion frame, a cushion pad supported by the seat cushion frame, and a skin material by which the cushion pad is covered (for example, Japanese Laid-open Patent Application, Publication No. 2002-66174). To be more specific, in this technique, the seat cushion frame is provided with a wire-like skin attachment member, and hooks provided at an end portion of the skin material are hooked on the skin attachment member, whereby the attachment of the skin member is carried out.

However, there is a drawback in this technique that the frame structure is complicated because the skin attachment member is provided on the seat cushion frame.

In view of the above, a second object of the present invention is to simplify the frame structure of the vehicle seat.

Further, the present invention seeks to downsize the cushion pad and to suppress deformation of the skin attachment member. The present invention also seeks to facilitate the work for attaching the skin material, to enhance the rigidity of the cushion pad, and to prevent the engagement portion from coming off the skin attachment member.

Conventionally, there is also known a vehicle seat in which the seat cushion pad has a through-opening for inserting a harness member for a seating sensor (for example, Japanese Laid-open Patent Application, Publication No. 2012-140064). Further, there is known a vehicle seat including an elastic member for supporting the seat cushion pad from the lower side of the seat cushion pad (for example, Japanese Laid-open Patent Application, Publication No. 2008-080904).

However, in the configuration in which the seat cushion pad having the through-opening is supported by the elastic member from the lower side of the seat cushion pad, if a portion around the through-opening is not favorably supported by the elastic member, there may be a concern that the portion around the through-opening deforms and a load is applied to the harness member.

In view of the above, a third object of the present invention is to reduce a load applied to the harness member to be inserted into the through-opening fainted in the seat cushion pad.

Further, the present invention seeks to facilitate the work for inserting the harness member into the through-opening and to suppress interference between the harness member and the elastic member. The present invention also seeks to favorably support the seat cushion pad by the elastic member, to reduce the weight of the seat cushion pad, and to reduce uncomfortable feeling of the occupant due to the presence of the through-opening.

According to the present invention which may achieve the first object, a vehicle seat comprises: right and left side frames; and an elastic member run between the right and left side frames and configured to support an occupant. The right and left side frames comprise: side walls disposed opposite to each other in a lateral direction; and flange portions respectively extending laterally inward from the side walls, and the elastic member is attached to the flange portions.

With this configuration, since the elastic member is attached to the flange portions extending laterally inward from the side walls, for example, as compared with the configuration in which the elastic member is attached to the side walls, it is possible that a structural object is disposed between the side walls and that the shape of the side walls is determined as desired.

In the above configuration, if the right and left side frames constitute a seat cushion frame, and each of the flange portions has a first engagement opening formed therein with which an engagement portion formed at an end portion of the elastic member is engaged, it is preferable that the elastic member is inserted through and engaged with the first engagement opening from a lower side to an upper side of the first engagement opening.

With this configuration, since the elastic member is inserted through and engaged with the first engagement opening from the lower side to the upper side of the first engagement opening, for example, as compared with the configuration in which the elastic member is inserted through and engaged with the first engagement opening from the upper side to the lower side of the first engagement opening, it is possible to suppress deformation of an distal end portion of the flange portion when a load is applied from the elastic member to the distal end portion.

In the above configuration, it is preferable that the flange portion is an upper flange portion extending laterally inward from an upper end thereof.

With this configuration, since the elastic member is supported by the upper flange portion which is less likely to deform by a downward load, it is possible to favorably support the occupant by the elastic member.

In the above configuration, it is preferable that the elastic member comprises a middle portion extending in the lateral direction, and slanted portions respectively extending obliquely upward from right and left ends of the middle portion.

With this configuration, since the both end sides of the elastic member are formed as the slanted portions, the elastic member can fit the buttocks of the occupant, so that the buttocks of the occupant can be favorably supported by the elastic member.

In the above configuration, the vehicle seat may comprise a height adjustment mechanism disposed between the slanted portions and the side walls and configured to adjust a height of the seat cushion frame.

With this configuration, since the height adjustment mechanism is disposed between the slanted portions of the elastic member and the side walls, it is possible to effectively utilize the space between the slanted portions and the side walls.

In the above configuration, if the elastic member is disposed at a position rearward of a front end portion of the height adjustment mechanism and frontward of a center of the height adjustment mechanism in a front-rear direction, it is preferable that the elastic member is engaged with the first engagement opening from a rear side of the first engagement opening.

With this configuration, since the elastic member is configured to be engaged with the first engagement opening from the rear side of the first engagement opening, it is possible to prevent the elastic member from interfering with the structure in the vicinity of the front end portion of the height adjustment mechanism (e.g., front link) when the elastic member is engaged with the first engagement opening.

In the above configuration, if the elastic member is disposed at a position frontward of a rear end portion of the height adjustment mechanism and rearward of a center of the height adjustment mechanism in a front-rear direction, it is preferable that the elastic member is engaged with the first engagement opening from a front side of the first engagement opening.

With this configuration, since the elastic member is configured to be engaged with the first engagement opening from the front side of the first engagement opening, it is possible to prevent the elastic member from interfering with the structure in the vicinity of the rear end portion of the height adjustment mechanism (e.g., rear link) when the elastic member is engaged with the first engagement opening.

The above configuration may further comprise a second engagement opening with which an end portion of the engagement portion is engaged with the engagement portion of the elastic member being inserted from the upper side to the lower side, and it is preferable that the end portion of the engagement portion of the elastic member is formed to extend to one side away from an imaginary line extending through the first engagement opening and the second engagement opening, and that the second engagement opening has an end portion remote from the first engagement opening and extending to the other side away from the imaginary line.

With this configuration, since the end portion of the engagement portion is formed to extend to one side away from the imaginary line extending through the first engagement opening and the second engagement opening, and the end portion of the second engagement opening that is remote from the first engagement opening is formed to extend to the other side away from the imaginary line, the end portion of the engagement portion and the second engagement opening can be located away from each other. This makes it possible to favorably keep the engagement between the elastic member and the side frames.

In the above configuration, if the first engagement opening and the second engagement opening are arranged in alignment with each other in a front-rear direction, it is preferable that the end portion of the engagement portion of the elastic member is formed to face laterally inward and that the end portion of the second engagement opening remote from the first engagement opening is formed to face laterally outward.

With this configuration, since the end portion of the engagement portion of the elastic member is formed to face laterally inward, the engagement portion can be formed as a C-shaped configuration, so that the work for attaching the elastic member to the first engagement opening and the second engagement opening can be eased.

In the above configuration, if the elastic member comprises two front-side and rear-side elastic members provided spaced apart in a front-rear direction, it is preferable that the flange portion has a front-side portion to which the front-side elastic member is attached and a rear-side portion to which the rear-side elastic member is attached, and a lateral width of the front-side portion is greater than that of the rear-side portion.

With this configuration, since the rigidity of the front-side portion of the flange portion can be enhanced by making the width of the front-side portion to which the front-side elastic member is attached greater than that of the rear-side portion to which the rear-side elastic member is attached, even if a large load is applied from the occupant to the front-side elastic member, for example, in a collision, the front-side portion of the flange portion can favorably receive the large load applied from the front-side elastic member.

In the above configuration, it is preferable that a recess portion is formed between the first engagement opening and the second engagement opening; the recess portion is recessed downward and extends from the first engagement opening to the second engagement opening.

With this configuration, since the recess portion is formed between the first engagement opening and the second engagement opening, the protrusion distance of the elastic member by which the elastic member protrudes upward from the upper surface of the flange portion can be decreased. This can downsize the vehicle seat in the upper-lower direction.

The above configuration may further comprise a cover member configured to cover the recess portion and placed on the engagement portion of the elastic member.

With this configuration, since the cover member is placed on the engagement portion of the elastic member that is disposed in the recess portion, the engagement portion of the elastic member can be sandwiched between the recess portion and the cover member. This can favorably keep the engagement between the elastic member and the engagement openings.

In the above configuration, it is preferable that the side frame has a first portion located frontward of the first engagement opening and a second portion located rearward of the first engagement opening and that the vehicle seat further comprises a reinforcement member extending from the first portion to the second portion and welded to the first portion and the second portion.

With this configuration, since the first portion and the second portion respectively located frontward and rearward of the first engagement opening are reinforced by the reinforcement member, the rigidity in the vicinity of the first engagement opening can be enhanced.

According to the present invention which may achieve the second object, a vehicle seat comprises: a cushion pad and a skin material covering the cushion pad, wherein a skin attachment member is provided at a reverse side of the cushion pad, and an engagement portion provided at an end portion of the skin material is engageable with the skin attachment member.

With this configuration, since the skin attachment member is provided at the reverse side of the cushion pad, as compared with the conventional configuration in which the skin attachment member is provided on the frame, it is possible to simplify the frame structure.

In the above configuration, a recess portion may be provided at a reverse surface of the cushion pad, and the skin attachment member may be configured to include a retention portion embedded and retained in the cushion pad, and an engaged portion exposed in the recess portion and engaged with the engagement portion.

With this configuration, since the skin attachment member can be embedded into the cushion pad without protruding from the reverse surface of the cushion pad, it is possible to downsize the cushion pad.

In the above configuration, the recess portion may comprise a plurality of recess portions arranged spaced apart along a direction in which the skin attachment member extends, and the retention portion of the skin attachment member may be embedded and retained in a middle portion located between the plurality of recess portions.

With this configuration, since the skin attachment member can be retained by the plurality of middle portions, for example, as compared with the embodiment in which the recess portion extends long in a direction in which the skin attachment member extends, it is possible to suppress deformation of the skin attachment member.

In the above configuration, if a sheet member for improving the rigidity of the cushion pad is provided on the reverse surface of the cushion pad, the sheet member may comprise cutaway portions for exposing the recess portions, and a middle reinforcement portion disposed to overlap the middle portion.

With this configuration, since the rigidity of the middle portion is improved by the middle reinforcement portion of the sheet member, it is possible to further suppress the deformation of the skin attachment member.

If the above configuration further comprises an elastic member extending in a direction from one end to another end of the cushion pad and including longitudinal and transverse dimensions to support the cushion pad from the reverse side thereof, the skin attachment member may be disposed so as not to overlap the elastic member as viewed from the reverse side.

With this configuration, the work for attaching the skin material can be eased because when the engagement portion of the skin material is attached to the skin attachment member, the elastic member does not obstruct the attachment.

In the above configuration, the elastic member may comprise a plurality of elastic members arranged in a transverse direction thereof, and the skin attachment member may be disposed outside the plurality of elastic members in the transverse direction.

With this configuration, even when the engagement portion of the skin material approaches the skin attachment member in the transverse direction from outside the elastic members, as the elastic members are not present outside the skin attachment member in the transverse direction, the work for attaching the skin material can be eased further, in comparison, for example, with the configuration in which the skin attachment member is disposed between the plurality of elastic members.

In the above configuration, if the elastic member is an S-shaped spring having a plurality of turns made in the transverse direction, the plurality of turns of the S-shaped spring include a bent portion protruding away from the recess portions, and the middle portion and the bent portion may be arranged in a same position in a longitudinal direction of the elastic member.

Herein, the term "same position" indicates that a portion of the middle portion and a portion of the bent portion are located in the same position.

With this configuration, since the middle portion is disposed in an open portion of the S-shaped spring, it is possible to enhance the rigidity of a portion of the cushion pad which is located in an open space of the open portion of the S-shaped spring, in comparison, for example, with the configuration in which the recess portion is formed to extend long in the longitudinal direction.

If the above configuration further comprises an elastic member extending in a direction from one end to another end of the cushion pad and including longitudinal and transverse dimensions to support the cushion pad from the reverse side thereof, the elastic member may be disposed directly behind a portion of the skin attachment member.

With this configuration, even if a local load is applied in the vicinity of the skin attachment member of the cushion pad, the elastic member can suppress sinking of the skin attachment member. Accordingly, it is possible to prevent the engagement portion from coming off the skin attachment member due to sinking of the skin attachment member.

According to the present invention which may achieve the third object, a vehicle seat comprises a seat cushion and a seat back. The seat cushion comprises a seat cushion pad having a through-opening for inserting a harness member, and an elastic member extending in a direction from one end to another end of the seat cushion pad and including longitudinal and transverse dimensions to support the cushion pad from a lower side of the seat cushion pad, wherein the elastic member and the through-opening are arranged to intersect one vertical plane extending in a longitudinal direction of the elastic member.

With this configuration, since a portion in the vicinity of the through-opening is supported by the elastic member, deformation of the through-opening of the seat cushion pad can be suppressed and a load applied to the harness member can be reduced.

In the above configuration, the through-opening may be disposed so as not to overlap the elastic member as viewed from the lower side.

With this configuration, the work for inserting the harness member into the through-opening can be eased because the elastic member does not obstruct the work. Further, since the through-opening and the elastic member do not overlap each other, interference between the harness member and the elastic member can be suppressed.

In the above configuration, the elastic member may be formed to extend along a peripheral edge of the through-opening.

This configuration makes it possible to more favorably support the portion in the vicinity of the through-opening by the elastic member.

In the above configuration, the elastic member may be an S-shaped spring having a plurality of turns made in a transverse direction of the elastic member.

With this configuration, the seat cushion pad can be favorably supported by the S-shaped spring.

The above configuration may comprise a pair of front-side and rear-side S-shaped springs extending laterally and provided spaced apart from each other in the front-rear direction, and the through-opening may be provided in a position corresponding to the front-side S-shaped spring, and further a portion of the front-side S-shaped spring which is located to surround the through-opening may open rearward.

With this configuration, since the through-opening is provided in the position corresponding to the front-side S-shaped spring, which is less likely to receive a load from the occupant than the rear-side S-shaped spring to which a large load is applied from the occupant, it is possible to reduce a load applied to the harness member while suppressing deformation of the through-opening. Further, since the portion of the front-side S-shaped spring which is located to surround the through-opening opens rearward, even if the through-opening and the harness member located in the through-opening are pulled rearward and moved when the rear portion of the seat cushion pad is deeply sunk by the load from the occupant, interference between the harness member and the S-shaped spring can be suppressed.

In the above configuration, the through-opening may be formed such that a lower-side opening thereof is larger than an upper-side opening thereof.

With this configuration, for example, as compared with the configuration in which the through-opening is formed to extend vertically straight, the weight of the seat cushion pad can be reduced for the amount corresponding to the extended lower-side portion of the through-opening. Further, since the upper-side opening of the through-opening is smaller, it is possible to reduce uncomfortable feeling experienced by the occupant when he/she sits on the seat cushion pad and feels the presence of the through-opening, for example, as compared with the configuration in which the upper-side opening of the through-opening is enlarged to reduce the weight.

DESCRIPTION OF EMBODIMENTS

Various embodiments of the present invention will be described in detail with reference made to the drawings where necessary, <First Embodiment>

With reference to FIGS. 1 to 5, the first embodiment of the present invention will be described. In the following description, the overall structure of a car seat as an example of a vehicle seat will be described briefly, and then characterizing features of the present invention will be described in detail.

Figure 1:
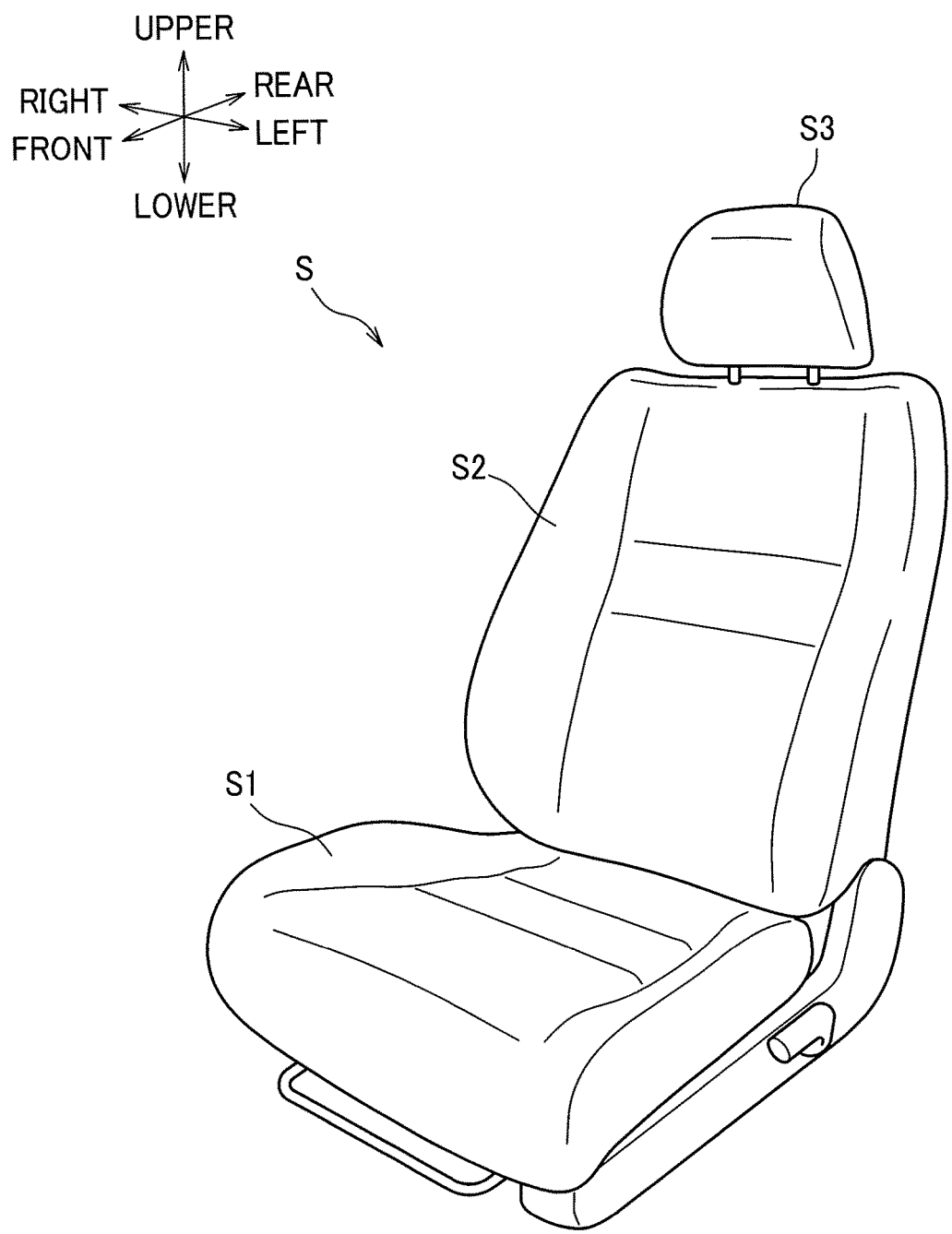
FIG. 1 is a perspective view of a car seat according to the first embodiment.

As seen in FIG. 1, the car seat S is a seat used in a driver's seat of an automobile, and mainly includes a seat cushion S1, a seat back S2, and a headrest S3.

Figure 2:
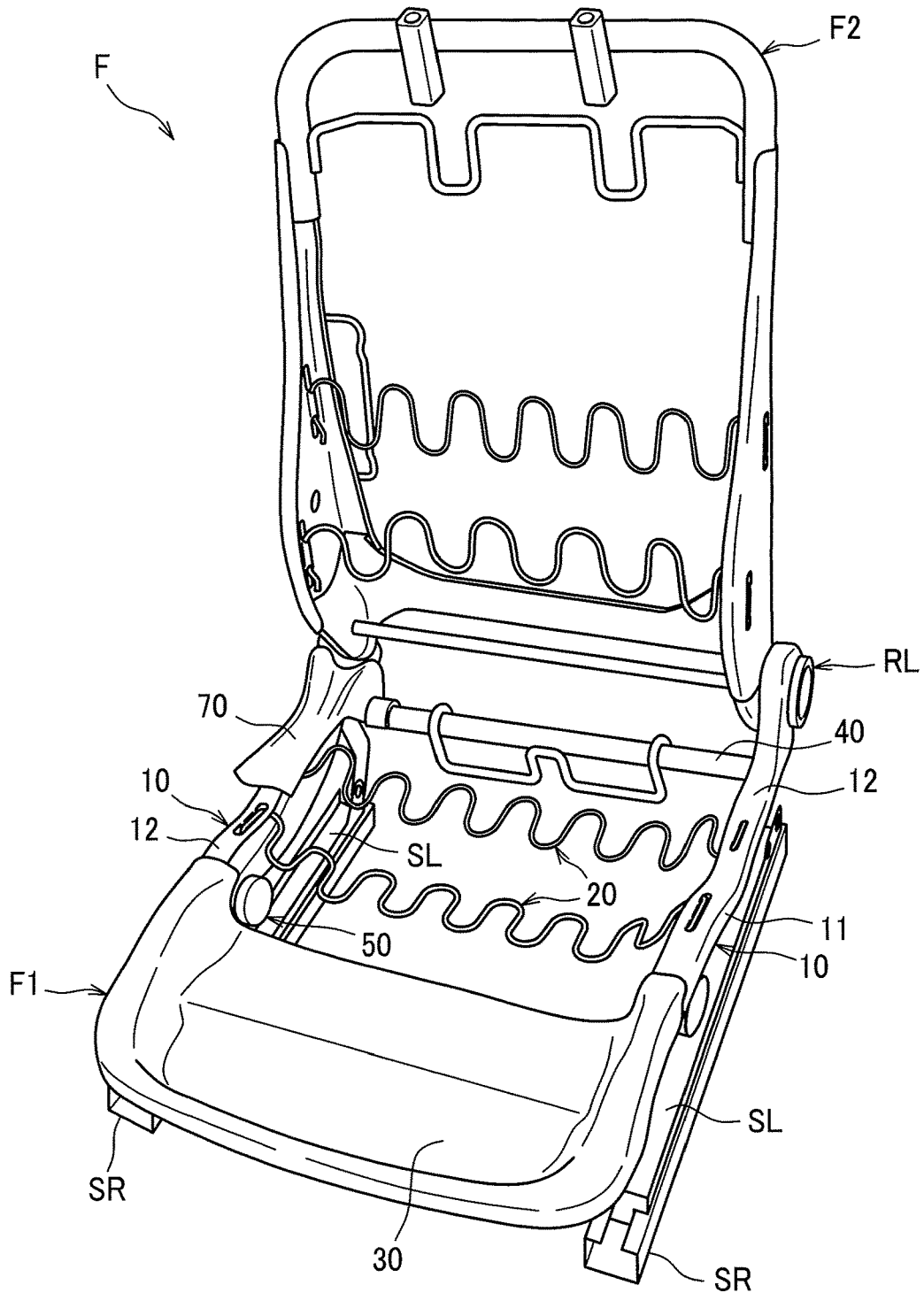
FIG. 2 is a perspective view of a seat frame embedded in the car seat.

A seat frame F as shown in FIG. 2 is embedded in the seat cushion S1 and the seat back S2. The seat frame F mainly includes a seat cushion frame F1 constituting a frame of the seat cushion S1, and a seat back frame F2 constituting a frame of the seat back S2. The seat cushion S1 is configured such that the seat cushion frame F1 is covered with a seat cushion pad made of a cushion material such as urethane foam, and a skin material made of synthetic leather or fabric. The seat back S2 is configured such that the seat back frame F2 is covered with a seat back pad made of a cushion material, and a skin material made of synthetic leather or fabric.

A seat cushion frame F1 is a frame in the shape of an approximately rectangular configuration, and is installed on sliders SL; the sliders SL are respectively supported by a pair of right and left slide rails SR provided on a floor of an automobile so as to be slidable in the front-rear direction with respect to the slide rails SR. Accordingly, the position of the car seat S is adjustable in the front-rear direction.

A lower portion of the seat back frame F2 is rotatably connected to a rear portion of the seat cushion frame F1 via a reclining mechanism RL. Accordingly, the seat back S2 is tiltable in the front-rear direction with respect to the seat cushion S1.

In the description, the front/rear (frontward/rearward), right/left (lateral), and upper/lower directions are designated as from the view point of an occupant seated on the car seat S without tilting down the seat back S2 by the reclining mechanism RL.

Next, the seat cushion frame F1 will be described in detail.

The seat cushion frame F1 mainly includes a pair of right and left side frames 10, two cushion springs 20 (as an example of an elastic member) run between the right and left side frames 10, a pan frame 30 connecting front portions of the side frames 10, and a connecting pipe 40 connecting rear end portions of the side frames 10.

Figure 3:
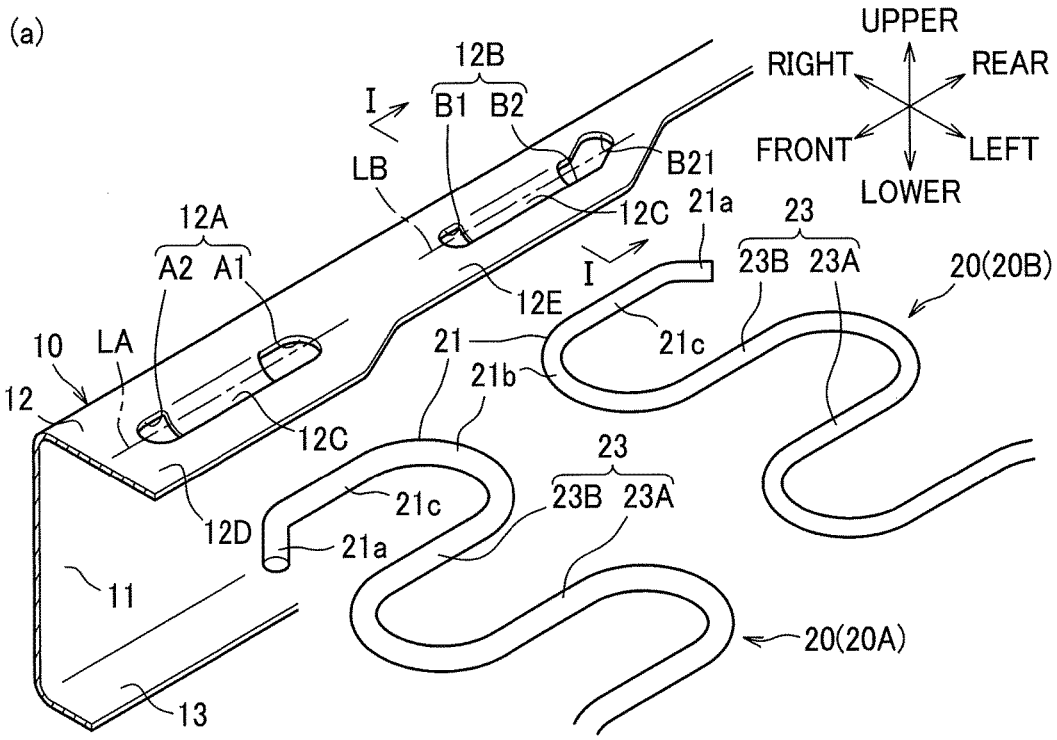
FIG. 3 shows a structure around engagement openings and a cushion spring and includes: (a) a perspective view thereof, and (b) a top view thereof.
Figure 3:
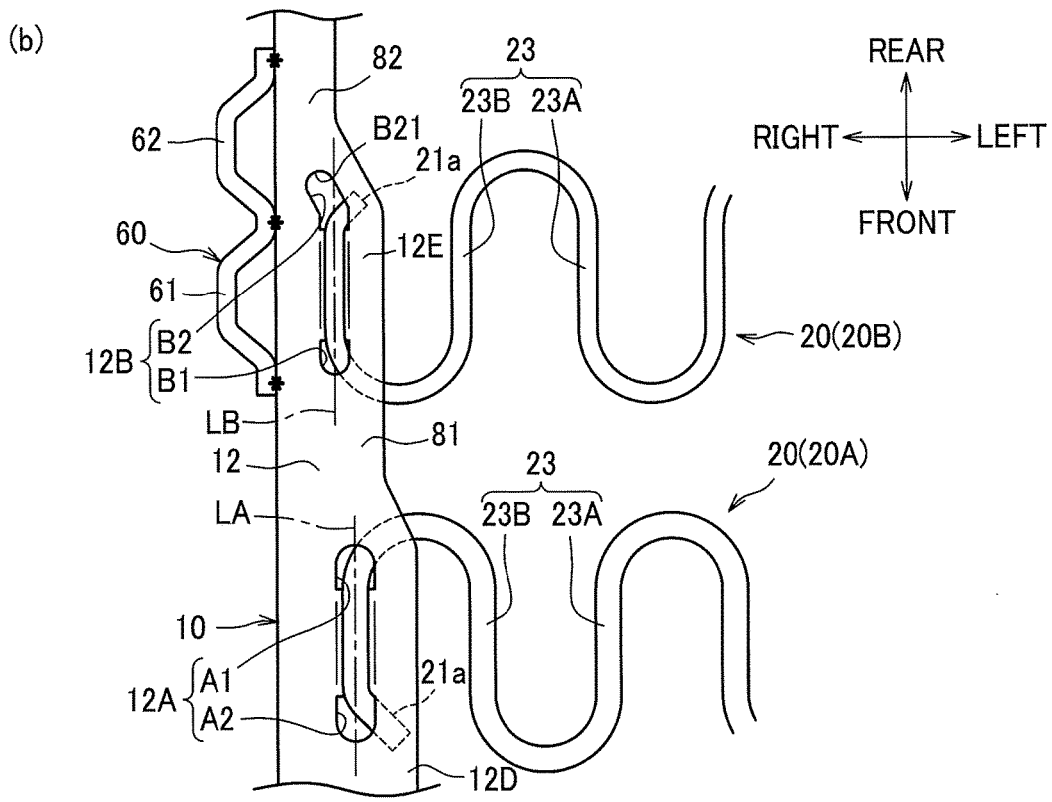
Figure 4:
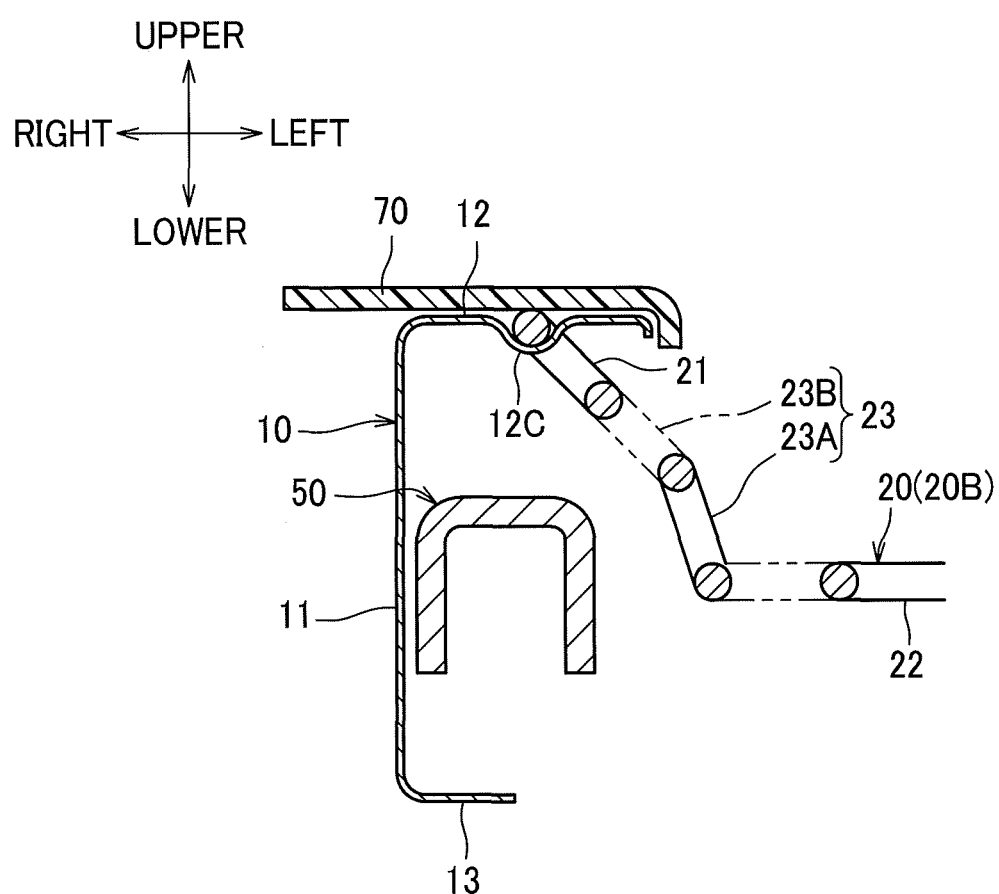
FIG. 4 is a sectional view taken along the line I-I of FIG. 3(*a*).
Figure 5:
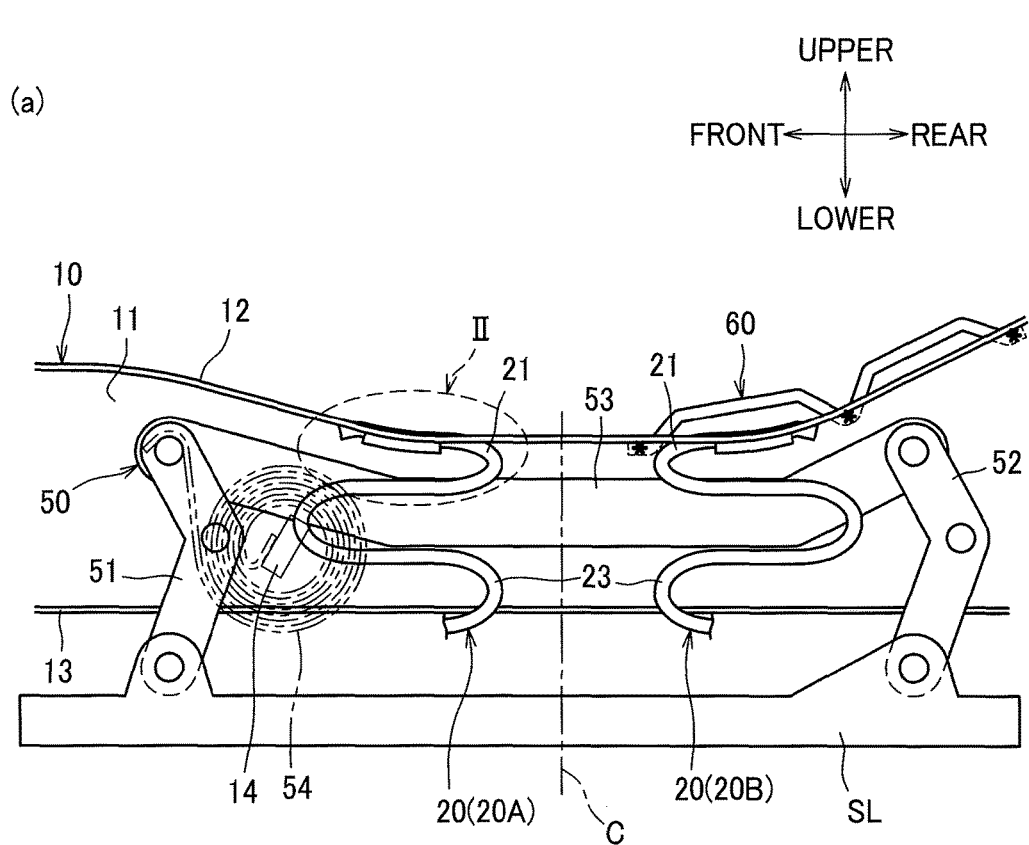
FIG. 5 shows a side frame as viewed from the laterally inner side and includes: (a) a side view thereof, and (b) a sectional view of the portion indicated by arrow II of FIG. 5(*a*).
Figure 5:
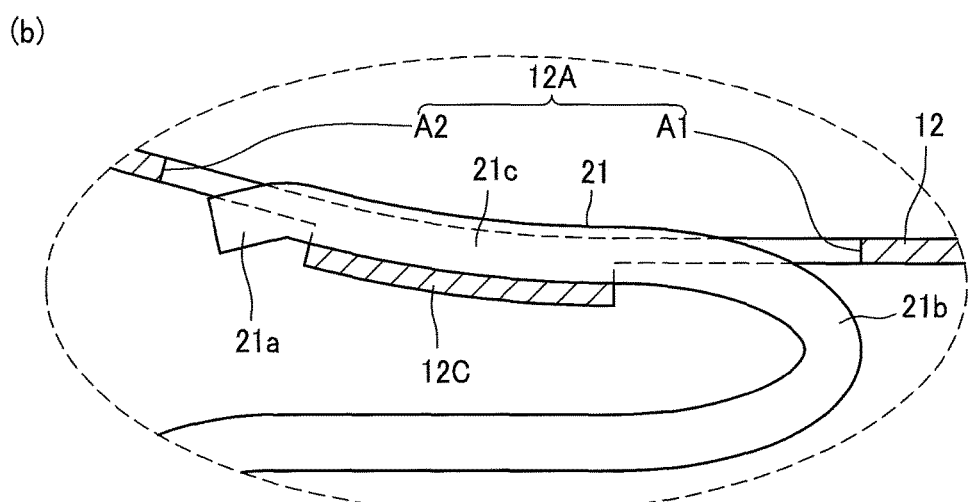

The right and left side frames 10 are frames extending in the front-rear direction and made of metal: the right and left side frames 10 are laterally spaced apart from each other. As seen in FIGS. 3 to 5, the right and left side frames 10 include right and left side walls 11 disposed opposite to each other in the lateral direction, upper flange portions 12 as an example of flange portions, and lower flange portions 13.

The upper flange portion 12 and the lower flange portion 13 are formed to extend laterally inward from the upper end and the lower end of the side wall 11. Further, the two cushion springs 20 are attached to the upper flange portion 12 such that these cushion springs 20 are spaced apart from each other in the front-rear direction.

As described above, since the cushion springs 20 are attached to the upper flange portions 12 configured to extend laterally inward from the side walls 11, for example, as compared with the configuration in which the cushion springs are attached to the side walls, it is possible that a height adjustment mechanism 50 to be described later is disposed between the side walls 11 at a position adjacent to the side walls 11 and that the shape of the side walls 11 is determined as desired. Further, since the cushion springs 20 are attached not to the lower flange portions 13 but to the upper flange portions 12 which is unlikely to deform by a downward load, it is possible to favorably support the occupant by the cushion springs 20.

To be more specific, engagement openings 12A, 12B are formed in the upper flange portion 12; an approximately C-shaped engagement portion 21 (to be described later) of the cushion spring 20 is engageable with the engagement openings 12A, 12B. Each of the engagement openings 12A, 12B includes a first engagement opening A1, B1 and a second engagement opening A2, B2, which are arranged in line in the front-rear direction.

For details, the first engagement opening A1, B1 is an opening for inserting the engagement portion 21 of the cushion spring 20 in a direction from the lower surface to the upper surface of the upper flange portion 12; the first engagement opening A1, B1 is configured to be engageable with a proximal portion 21b (i.e., a connecting portion for connecting a slanted portion 23) of the engagement portion 21 in a state where the engagement portion 21 is attached to the engagement opening 12A, 12B. The second engagement opening A2, B2 is an opening for inserting the engagement portion 21 of the cushion spring 20 in a direction from the upper surface to the lower surface of the upper flange portion 12; the second engagement opening A2, B2 is configured to be engageable with an end portion 21a of the engagement portion 21 in a state where the engagement portion 21 is attached to the engagement opening 12A, 12B.

For more details, in a state where the engagement portion 21 is attached to the engagement opening 12A, 12B, the end portion 21a of the engagement portion 21 is formed to face laterally inward (see FIG. 3 (b)). In other words, the end portion 21a of the engagement portion 21 is bent to extend to one side away from an imaginary line LA, LB extending through the first engagement opening A1, B1 and the second engagement opening A2, B2. Accordingly, it is possible to favorably keep the engagement between the cushion spring 20 and the side frame 10.

Further, the rear end portion B21 (i.e., the end portion opposite to and remote from the first engagement opening B1) of the second engagement opening B2 of the rear-side engagement opening 12B is formed to face laterally outward. In other words, the rear end portion B21 of the second engagement opening B2 is formed to extend to the other side (i.e., direction opposite to the direction in which the end portion 21a of the engagement portion 21 extends) away from the imaginary line LB.

As described above, since the direction in which the end portion 21a of the engagement portion 21 extends and the direction in which the rear end portion B21 of the second engagement opening B2 extends are opposite to each other, the end portion 21a of the engagement portion 21 and the rear end portion B21 of the second engagement opening B2 are located away from each other. Accordingly, it is possible to favorably keep the engagement between the cushion spring 20 and the side frame 10.

Further, since the end portion 21a of the engagement portion 21 is formed to face laterally inward, the engagement portion 21 can be formed as a C-shaped configuration, so that the work for attaching the cushion spring 20 to the first engagement opening A1, A2 and the second engagement opening A2, B2 can be eased.

Further, a recess portion 12C configured to be recessed downward is formed between the first engagement opening A1, B1 and the second engagement opening A2, B2. The recess portion 12C is shaped as an approximately semi-cylindrical configuration and extends from the first engagement opening A1, B1 to the second engagement opening A2, B2.

As described above, since the recess portion 12C is formed between the first engagement opening A1, B1 and the second engagement opening A2, B2, the protrusion distance of the cushion spring 20 by which the cushion spring 20 protrudes upward from the upper surface of the upper flange portion 12 can be decreased (see FIG. 4). This can downsize the car seat S in the upper-lower direction.

Further, the upper flange portion 12 has a front-side portion 12D in which the front-side engagement opening 12A is formed and a rear-side portion 12E in which the rear-side engagement opening 12B is formed, and the lateral width of the front-side portion 12D is greater than that of the rear-side portion 12E.

As described above, since the upper flange portion 12 is formed such that the lateral width of the front-side portion 12D is greater than that of the rear-side portion 12E, the rigidity of the front-side portion 12D of the upper flange portion 12 can be enhanced. Accordingly, even if a large load is applied from the occupant to the front-side cushion spring 20A, the load applied from the front-side cushion spring 20A can be favorably received by the widened front-side portion 12D of the upper flange portion 12.

Further, a reinforcement rod 60 as an example of a reinforcement member is welded to the side wall 11 of the side frame 10; the reinforcement rod 60 has a meandering shape and extends in the front-rear direction. To be more specific, the reinforcement rod 60 includes a first curved portion 61 having an approximately U-shaped configuration which opens laterally inward, and a second curved portion 62 consecutively extending from the rear end portion of the first curved portion 61 and having an approximately U-shaped configuration which opens laterally inward.

The first curved portion 61 is formed to extend from a first portion 81 located frontward of the rear-side engagement opening 12B to a second portion 82 located rearward of the rear-side engagement opening 12B, and both ends of the first curved portion 61 are welded to the first portion 81 and the second portion 82, respectively. With this configuration in which the first portion 81 and the second portion 82 respectively located frontward and rearward of the rear-side engagement opening 12B are reinforced by the reinforcement rod 60, the rigidity in the vicinity of the rear-side engagement opening 12B can be enhanced.

According to this embodiment, in particular, the first curved portion 61 is welded to the side wall 11 corresponding to the narrowed rear-side portion 12E. Accordingly, in this embodiment, the rigidity in the vicinity of the narrowed rear-side portion 12E can also be enhanced by the reinforcement rod 60.

The two cushion springs 20 arranged in the front-rear direction are springs for receiving a load from the occupant, and they have similar structures. To be more specific, the cushion spring 20 is an S-spring (wave spring or zigzag spring) extending laterally with a plurality of turns made in the front-rear direction; as seen in FIG. 4, the S-shaped spring includes a middle portion 22 extending in the lateral direction, slanted portions 23 extending obliquely upward (laterally outward and upward) from right and left ends (only one end is shown in the figure) of the middle portion 22, and engagement portions 21 provided at laterally outer ends of the slanted portions 23.

With this configuration in which the both end sides of each of the cushion springs 20 are formed as the slanted portions 23, the cushion springs 20 can fit the buttocks of the occupant, so that the buttocks of the occupant can be favorably supported by the cushion springs 20.

Further, a portion of the height adjustment mechanism 50 configured to adjust the height of the seat cushion frame F1 is disposed between the slanted portions 23 and the side walls 11 of the side frames 10. With this configuration, since the height adjustment mechanism 50 is disposed between the slanted portions 23 and the side walls 11, it is possible to effectively utilize the space between the slanted portions 23 and the side walls 11.

According to this embodiment, in particular, the slanted portion 23 includes a first slanted portion 23A extending from the end portion of the middle portion 22 and having a large slant angle with respect to the horizontal plane, and a second slanted portion 23B extending from the laterally outward end portion of the first slanted portion 23A and having a smaller slant angle with respect to the horizontal plane than that of the first slanted portion 23A. With this configuration in which the slanted portion 23 consists of the two slanted portions 23A, 23B, it is possible to leave a space between the slanted portion 23 and the height adjustment mechanism 50. Therefore, interference between the slanted portion 23 and the height adjustment mechanism 50 can be suppressed.

It is to be noted that the height adjustment mechanism 50 is provided in proximity of the right and left side frames 10, and mainly includes in pairs a front link 51, a rear link 52, an upper link 53, a slider SL, and a spiral spring 54. The front link 51 and the rear link 52 are each shaped like a "V", and the lower ends thereof are rotatably connected to a front end portion and a rear end portion of the slider SL, respectively, whereas center portions (portions corresponding to valleys of Vs) are rotatably connected to the side frame 410.

Namely, a four-bar linkage is formed by the side frame 10, the lower half portions of the front link 51 and the rear link 52, and the slider SL, so that tilting the front link 51 and the rear link 52 in the frontward direction or in the rearward direction causes the side frame 10 to move upward or downward. Further, upper end portions of the front link 51 and the rear link 52 are rotatably connected to the upper link 53.

The spiral spring 54 is a spring for urging the front link 51 in a direction to raise the front link 51; the spiral spring 54 is disposed laterally inward of the front link 51, and the end thereof that is located closer to the center of the spiral spring 54 is engaged with a spring engagement portion 14 formed on the side frame 10 whereas the outer end thereof is engaged with a rotary shaft for the front link 51 and the upper link 53. Further, the front link 51 is configured to be tilted in the frontward direction or in the rearward direction when a driving force from an operating lever (not shown) is transmitted to the front link 51.

In the height adjustment mechanism 50 configured as described above, if the side frame 10 is to be lowered, the occupant manipulates the operating lever in one direction to tilt the front link 51 in a rearward-and-downward direction against the urging force of the spiral spring 54 to thereby lower the side frame 10. On the contrary, if the side frame 10 is to be lifted, the occupant manipulates the operating lever in the other direction to tilt the front link 51 in a frontward-and-upward direction. In this operation, when the occupant manipulates the operating lever in the other direction, the manipulation of the operating lever is assisted by the spiral spring 54.

As seen in FIGS. 3(a) and 5(a) and 5(b), the engagement portion 21 includes a base portion 21b configured to be bent in an approximately C-shaped configuration, a straight portion 21c extending in the front-rear direction from the base portion 21b, and an end portion 21a configured to be bent laterally inward from the straight portion 21c, and is formed as a whole to have an approximately C-shaped configuration which opens laterally inward. Further, the engagement portion 21 provided in the front-side cushion spring 20A is formed such that the end portion 21a thereof faces approximately frontward, and the engagement portion 21 provided in the rear-side cushion spring 20B is formed such that the end portion 21a thereof faces approximately rearward.

The two cushion springs 20A, 20B are respectively disposed frontward and rearward of an occupant's seating position (i.e., the position to which a load from the occupant is most heavily applied during the driving of the automobile). Accordingly, when the occupant sits on the seat cushion S1, the load from the occupant is applied to the front-side and rear-side cushion springs 20A, 20B such that the cushion springs 20A, 20B move in opposite directions away from each other. However, even with this configuration, since the end portion 21a of the front-side engagement portion 21 faces frontward and the end portion 21a of the rear-side engagement portion 21 faces rearward as described above, it is possible to favorably keep the engagement between the cushion springs 20 and the side frames 10. Further, even if a large frontward force is applied from the occupant to the front-side cushion spring 20A in a collision of the automobile, it is possible to favorably keep the engagement between the cushion springs 20 and the side frames 10.

Further, the front-side cushion spring 20A is disposed at a position rearward of the front end portion of the height adjustment mechanism 50 and frontward of a center C of the height adjustment mechanism 50 in the front-rear direction, and is engaged with the front-side engagement opening 12A from the rear side of the front-side engagement opening 12A because the end portion 21a of the engagement portion 21 faces approximately frontward. With this configuration, it is possible to prevent the front-side cushion spring 20A from interfering with the structure in the vicinity of the front end portion of the height adjustment mechanism 50 (e.g., spiral spring 54) when the front-side cushion spring 20A is engaged with the front-side engagement opening 12A.

Further, the rear-side cushion spring 20B is disposed at a position frontward of the rear end portion of the height adjustment mechanism 50 and rearward of the center C of the height adjustment mechanism 50 in the front-rear direction, and is engaged with the rear-side engagement opening 12B from the front side of the rear-side engagement opening 12B because the end portion 21a of the engagement portion 21 faces approximately rearward. With this configuration, it is possible to prevent the rear-side cushion spring 20B from interfering with the structure in the vicinity of the rear end portion of the height adjustment mechanism 50 (e.g., rear link 52) when the rear-side cushion spring 20B is engaged with the rear-side engagement opening 12B.

Each engagement portion 21 is inserted in the engagement opening 12A, 12B from below and engaged with the engagement opening 12A, 12B. Since the engagement portion 21 of the cushion spring 20 is engaged with the engagement opening 12A, 12B from below, it is possible to prevent the distal end portion (laterally inward end portion) of the upper flange portion 12 from receiving a load from the cushion spring 20, for example, as compare with the configuration in which the engagement portion of the cushion spring is engaged with the engagement opening from above.

Further, the wire diameter of the front-side cushion spring 20A is greater than that of the rear-side cushion spring 20B. With this configuration, even if a larger load is applied from the occupant during the braking or the like to the front-side cushion spring 20A than to the rear-side cushion spring 20B, the load can be favorably received by the cushion spring 20A having the large wire diameter.

In accordance with the cushion springs 20A, 20B having different wire diameters, the front-side engagement opening 12A and the rear-side engagement openings 12B may be different in size, and the front-side recess portion 12C and the rear-side recess portion 12C may be different in size. As an alternative, in accordance with the size of the cushion spring 20A having a large wire diameter, the front-side engagement opening 12A and the rear-side engagement opening 12B may be formed in the same in size, and the recess portions 12C may be formed in the same in size.

Further, as seen in FIGS. 2 and 4, a cover member 70 for covering the reclining mechanism RL (recess portion 12C) is provided on top of the engagement portion 21 engaged with the rear-side engagement opening 12B. With this configuration, since the engagement portion 21 can be sandwiched between the recess portion 12C and the cover member 70, it is possible to favorably keep the engagement between the rear-side cushion spring 20B and the rear-side engagement opening 12B.

Although the first embodiment of the present invention has been described above, the present invention is not limited to this embodiment and may be carried out into practice in various other ways, as will be described below.

In the above-described first embodiment, the cushion spring 20 in the form of an S-shaped spring is exemplified as an elastic member. However, the present invention is not limited to this configuration; for example, any known spring other than the S-shaped spring may be used as long as it is made by bending a wire, and alternatively rubber may be used.

In the above-described first embodiment, the present invention is applied to the side frames 10 of the seat cushion frame F1. However, the present invention is not limited to this specific configuration; for example, the present invention may be applied to the side frames of the seat back frame.

In the above-described first embodiment, the cushion springs 20 is attached to the upper flange portions 12. However, the present invention is not limited to this specific configuration; for example, the cushion springs may be attached to the lower flange portions.

In the above-described first embodiment, the first engagement opening A1, B1 and the second engagement opening A2, B2 are arranged in line in the front-rear direction. However, the present invention is not limited to this specific configuration; for example, the first engagement opening and the second engagement opening may be arranged in line in a direction that is slanted with respect to the front-rear direction.

In the above-described first embodiment, the cover member 70 for the reclining mechanism RL is placed on top of the engagement portion 21. However, the present invention is not limited to this specific configuration, and any cover member may be employed.

In the above-described first embodiment, the reinforcement rod 60 is exemplified as a reinforcement member. However, the present invention is not limited to this specific configuration; for example, a reinforcement member having an L-shaped section or a U-shaped section may be employed.

In the above-described first embodiment, the car seat S used for an automobile is exemplified as an example of a vehicle seat. However, the present invention is not limited to the car seat, and may be applied to other vehicle seat, such as a seat for a ship or an aircraft.

<Second Embodiment>

With reference to FIGS. 6 to 11, the second embodiment of the present invention will be described below. Constituent elements similar to those previously described in the first embodiment are denoted by the same reference numerals and detailed description thereof will be omitted.

Figure 6:
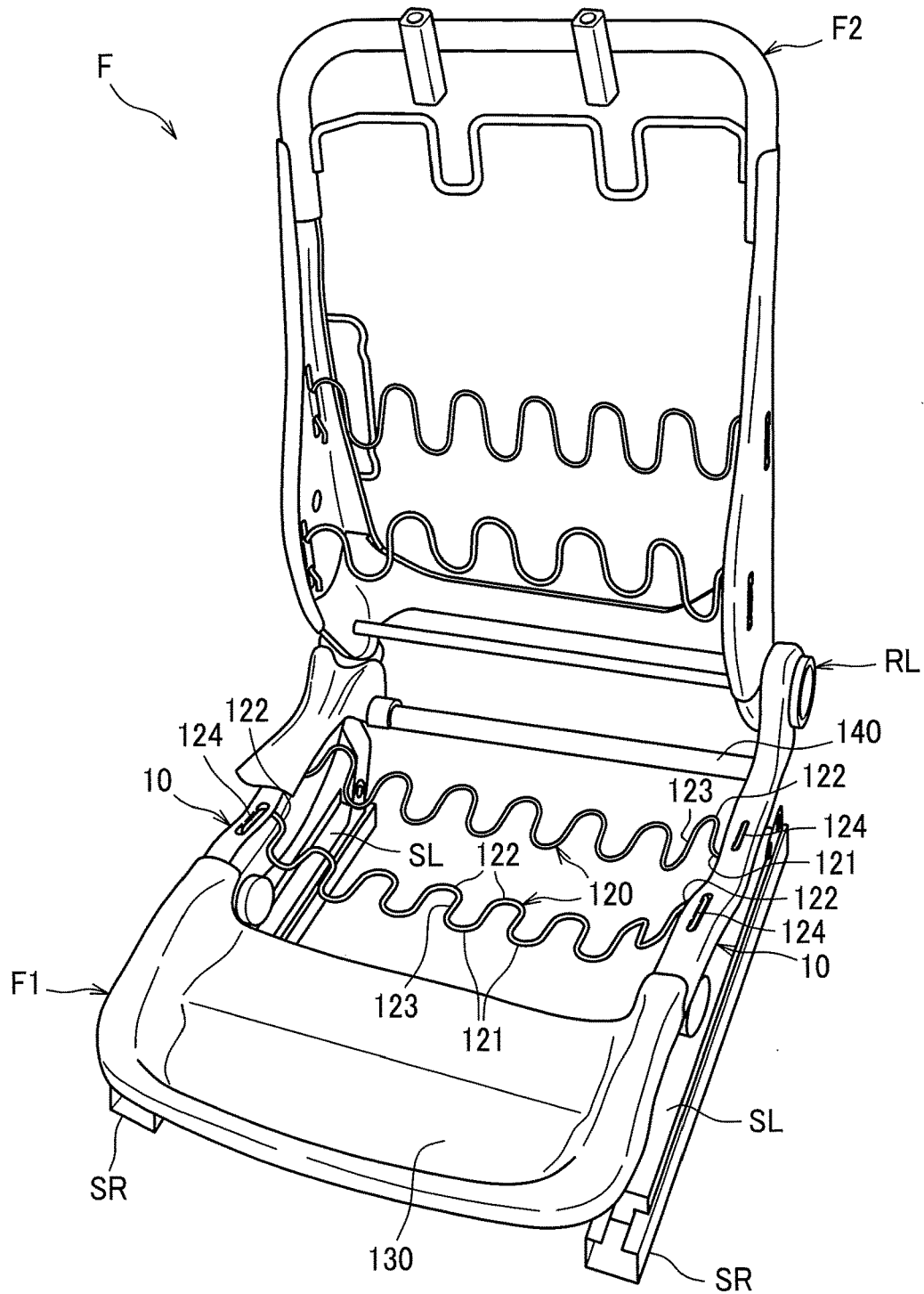
FIG. 6 is a perspective view of the seat frame embedded in the car seat according to the second embodiment of the present invention.

A seat frame F as shown in FIG. 6 is embedded in the seat cushion S1 (see FIG. 1) and the seat back S2 (see FIG. 1). The seat frame F mainly includes a seat cushion frame F1 constituting a frame of the seat cushion S1, and a seat back frame F2 constituting a frame of the seat back S2. The seat cushion S1 is configured such that the seat cushion frame F1 is covered with a seat cushion pad 200 (see FIG. 7) as an example of a cushion pad made of a cushion material such as urethane foam, and a skin material 300 (see FIG. 9) made of synthetic leather or fabric. The seat back S2 is configured such that the seat back frame F2 is covered with a seat back pad made of a cushion material, and a skin material made of synthetic leather or fabric.

A seat cushion frame F1 is a frame in the shape of an approximately rectangular configuration, and is installed on sliders SL; the sliders SL are respectively supported by a pair of right and left slide rails SR provided on a floor of an automobile so as to be slidable in the front-rear direction with respect to the slide rails SR. Accordingly, the position of the car seat S is adjustable in the front-rear direction.

A lower portion of the seat back frame F2 is rotatably connected to a rear portion of the seat cushion frame F1 via a reclining mechanism RL. Accordingly, the seat back S2 is tiltable in the front-rear direction with respect to the seat cushion S1.

Next, the seat cushion frame F1 and the seat cushion pad 200 will be described in detail.

The seat cushion frame F1 mainly includes a pair of right and left side frames 10, two S-shaped springs 120 (as an example of an elastic member) run between the right and left side frames 10, a pan frame 130 connecting front portions of the side frames 10, and a cylindrical pipe-shaped connecting pipe 140 connecting rear end portions of the side frames 10.

The right and left side frames 10 are frames extending in the front-rear direction and made of metal: the right and left side frames 10 are laterally spaced apart from each other. The pan frame 130 is disposed at an approximately front-half portion between the right and left side frames 10, and the two S-shaped springs 120 spaced apart from each other in the front-rear direction (i.e., transverse direction of the S-shaped spring 120) are attached to an approximately rear-half portion between the right and left side frames 10.

Each of the S-shaped springs 120 is a long spring extending laterally with a plurality of turns made in the front-rear direction. To be more specific, the S-shaped spring 120 includes a plurality of front-side bent portions 121 each having an approximately circular arc configuration which protrudes frontward, a plurality of rear-side bent portions 122 each having an approximately circular arc configuration which protrudes rearward, a plurality of connecting portions 123 each having an approximately linear configuration and configured to connect the front-side bent portion 121 and the rear-side bent portion 122, and engagement portions 124 each formed at the outermost front-side bent portion 121 or the outermost rear-side bent portion 122 and configured to be engageable with the side frame 10.

The pan frame 130 is an approximately box-like member which opens upward and rearward.

Figure 7:
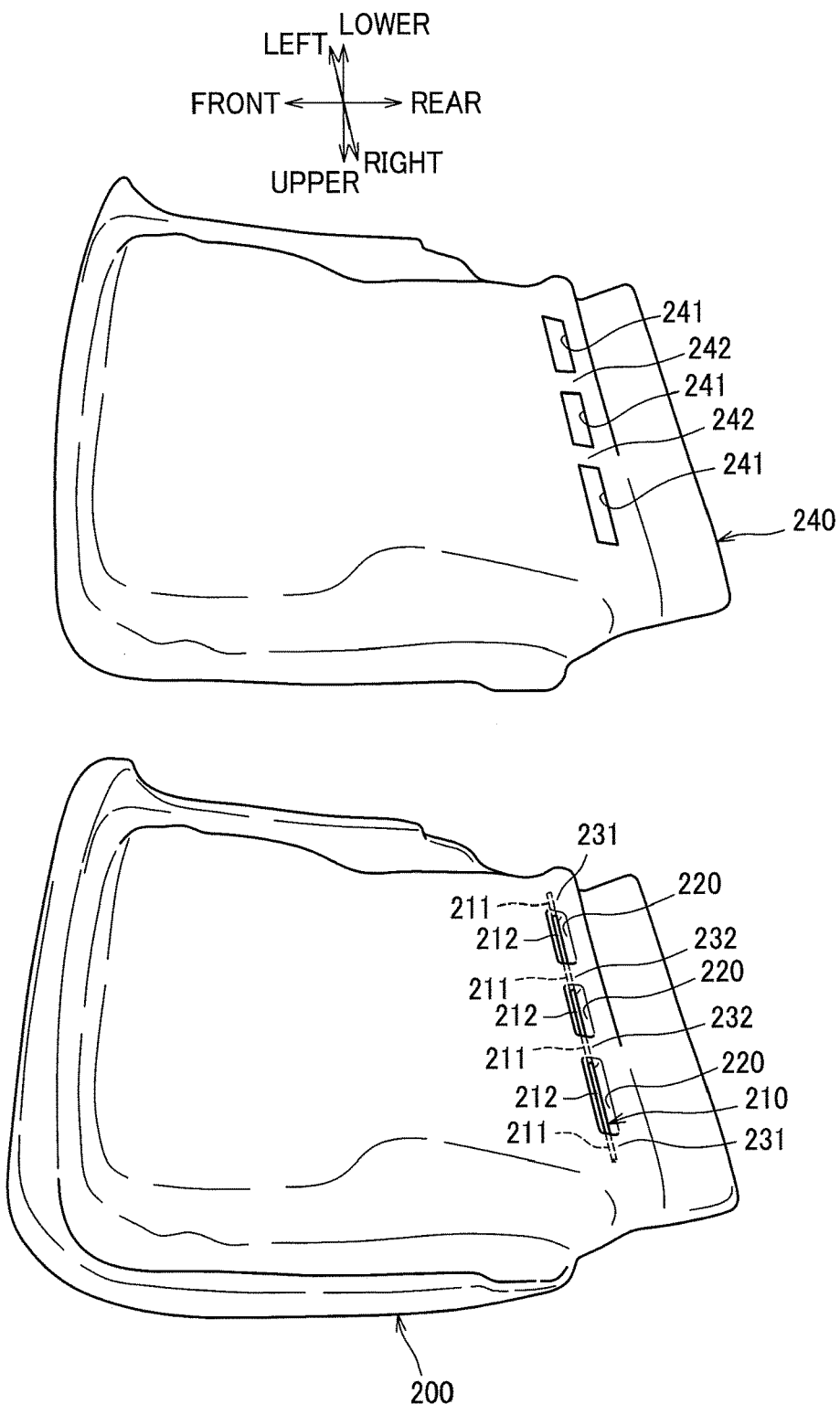
FIG. 7 is a perspective view of a seat cushion pad and a coarse blanket as viewed from the bottom side.

The right and left side frames 10, the pan frame 130, and the two S-shaped springs 120 are covered with the seat cushion pad 200 as shown in FIG. 7. Accordingly, the seat cushion pad 200 is supported by the side frames 10, the pan frame 130, and the S-shaped springs 120 from the lower side (reverse side) of the seat cushion pad 200.

Figure 8:
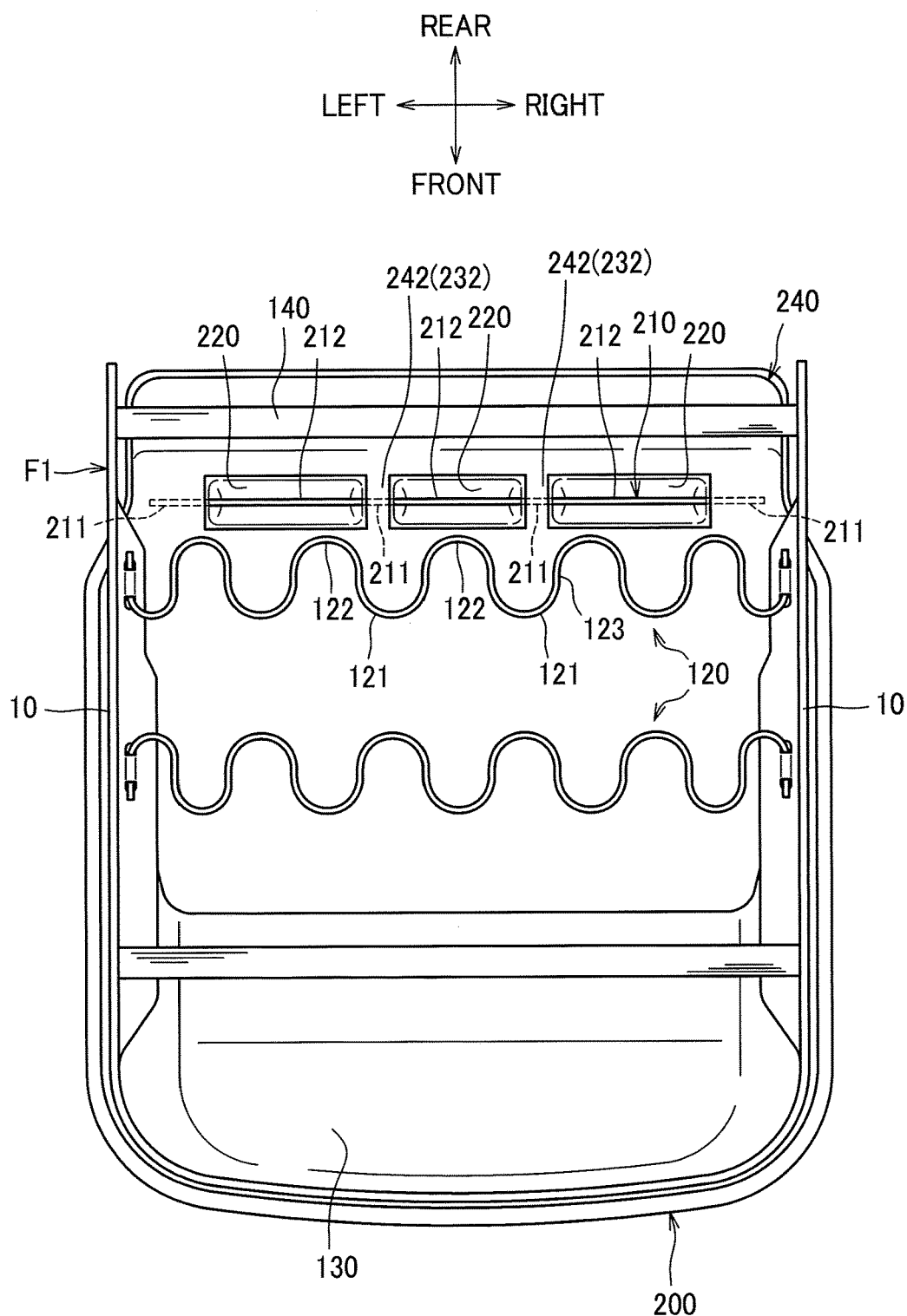
FIG. 8 is a bottom view of S-shaped springs and the seat cushion pad as viewed from the bottom side.
Figure 9:
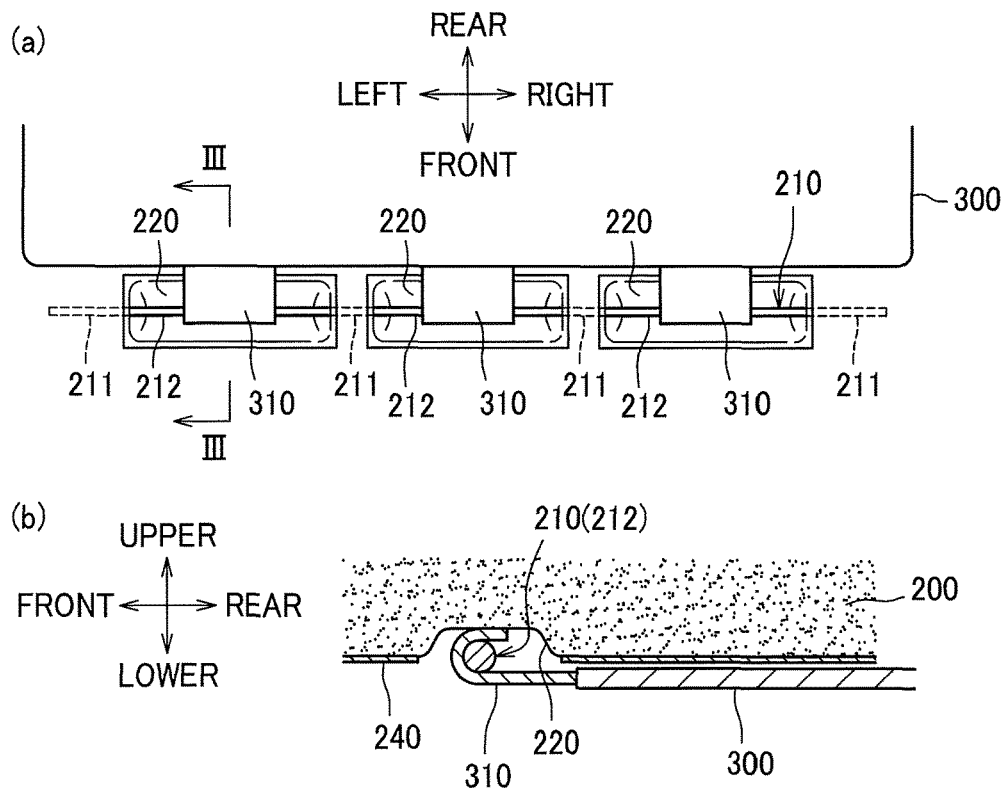
FIG. 9 includes (a) an enlarged bottom view showing a portion around a skin attachment wire, and (b) a sectional view taken along the line of FIG. 9(*a*).

As seen in FIGS. 7 to 9, a skin attachment wire 210 (as an example of a skin attachment member) is provided at a bottom rear portion of the seat cushion pad 200; engagement portions 310 provided at an end portion of the skin material 300 are engageable with the skin attachment wire 210. With this configuration, as compared with the conventional configuration in which the skin attachment member is provided on the frame, it is possible to simplify the frame structure of the seat cushion frame F1.

Three engagement portions 310 are provided laterally spaced apart from each other at the rear end portion of the skin material 300; the front end of each engagement portion 310 is bent along the peripheral surface of the skin attachment wire 210 (i.e., engaged portion 212 to be described later) so as to be engageable with the skin attachment wire 210. The engagement portions 310 are also provided at another end portion of the skin material 300 where necessary.

To be more specific, three recess portions 220 in the shape of a rectangle extending long in the lateral direction are provided at the bottom rear portion of the seat cushion pad 200; the recess portions 220 are laterally spaced apart (in a direction in which the skin attachment wire 210 extends) from each other, and the skin attachment wire 210 is embedded in the seat cushion pad 200 so as to extend laterally through the three recess portions 220. More specifically, the skin attachment wire 210 is a rod-like member extending laterally and made of metal; the skin attachment wire 210 includes four retention portions 211 embedded and retained in the seat cushion pad 200, and three engaged portions 212 respectively exposed in the recess portions 220 and engaged with the engagement portions 310 of the skin material 300.

With this configuration in which the skin attachment wire 210 is embedded in the seat cushion pad 200, the skin attachment wire 210 does not protrude from the lower surface of the seat cushion pad 200, so that the seat cushion pad 200 can be downsized.

Further, the two laterally outermost retention portions 211 among the four retention portions 211 are embedded and retained in two outer portions 231 located laterally outside the three recess portions 220, whereas the two center retention portions 211 are embedded and retained in the two middle portions 232 formed between the three recess portions 220. Accordingly, since not only the two outer portions 231 but also the two middle portions 232 retain the skin attachment wire 210, for example, as compared with an embodiment in which the recess portion is one groove elongated in the lateral direction, the number of portions for retaining the skin attachment wire 210 can be increased, so that deformation of the skin attachment wire 210 can be suppressed.

Further, a coarse blanket 240 as an example of a sheet member is provided on the reverse surface of the seat cushion pad 200. The coarse blanket 240 is a fabric for improving the rigidity of the seat cushion pad 200 and preventing the reverse surface of the seat cushion pad 200 from being torn as well as for suppressing noise from the road surface; three exposure openings 241 as an example of cutaway portions are formed at the rear portion of the coarse blanket 240.

In order to expose the recess portions 220 of the seat cushion pad 200 to view, the exposure openings 241 are respectively formed in shapes matching the shapes of the recess portions 220 at positions corresponding to the recess portions 220. Further, portions of the coarse blanket 240 located between the exposure openings 241 are formed as two middle reinforcement portions 242 disposed to overlap the two middle portions 232. With this configuration in which the middle reinforcement portions 242 are provided to overlap the middle portions 232, for example, as compared with the structure in which the exposure opening is formed as one opening elongated in the lateral direction, the rigidity of the middle portions 232 can be reinforced by the middle reinforcement portions 242. Accordingly, deformation of the skin attachment wire 210 can be further suppressed.

Further, the skin attachment wire 210 is disposed so as not to overlap the S-shaped springs 120 as viewed from the lower side. Accordingly, the work for attaching the skin material 300 can be eased because when the engagement portions 310 of the skin material 300 are attached to the skin attachment wire 210 from the lower side, the S-shaped springs do not obstruct the attachment.

Especially, in this embodiment, the skin attachment wire 210 is disposed rearward (outside in the transverse direction) of the two S-shaped springs 120. Accordingly, even when the engagement portions 310 of the skin material 300 approach the skin attachment wire 210 from the rear side, as the S-shaped springs 120 are not present at the rear side of the skin attachment wire 210, the work for attaching the skin material 300 can be eased further, in comparison, for example, with the structure in which the skin attachment wire is disposed between the two S-shaped springs.

Further, the middle portions 232, the middle reinforcement portions 242, and the front-side bent portions 121 (i.e., bent portions protruding in a direction away from the recess portions 220) of the S-shaped spring 120 are arranged in the same position in the lateral direction (i.e., longitudinal direction of the S-shaped spring 120). More specifically, a portion of each middle portion 232, a portion of each middle reinforcement portion 242, and a portion of the front-side bent portion are arranged in the same lateral position.

With this configuration, since the middle portion 232 and the middle reinforcement portion 242 are disposed in an open portion of the S-shaped spring 120, it is possible to enhance the rigidity of a portion of the seat cushion pad 200 which is located in an open space (i.e., a portion located between two adjacent rear-side bent portions 122) of the open portion of the S-shaped spring 120, in comparison, for example, with the configuration in which the recess portion is formed as one groove elongated in the lateral direction.

[First Modified Embodiment]

Next, a first modified embodiment will be described in detail with reference made to the drawings where necessary. As the first modified embodiment is a modification of the structure in the vicinity of the skin attachment wire according to the above-described second embodiment, constituent elements similar to those previously described in the second embodiment are denoted by the same reference numerals and detailed description thereof will be omitted.

Figure 10:
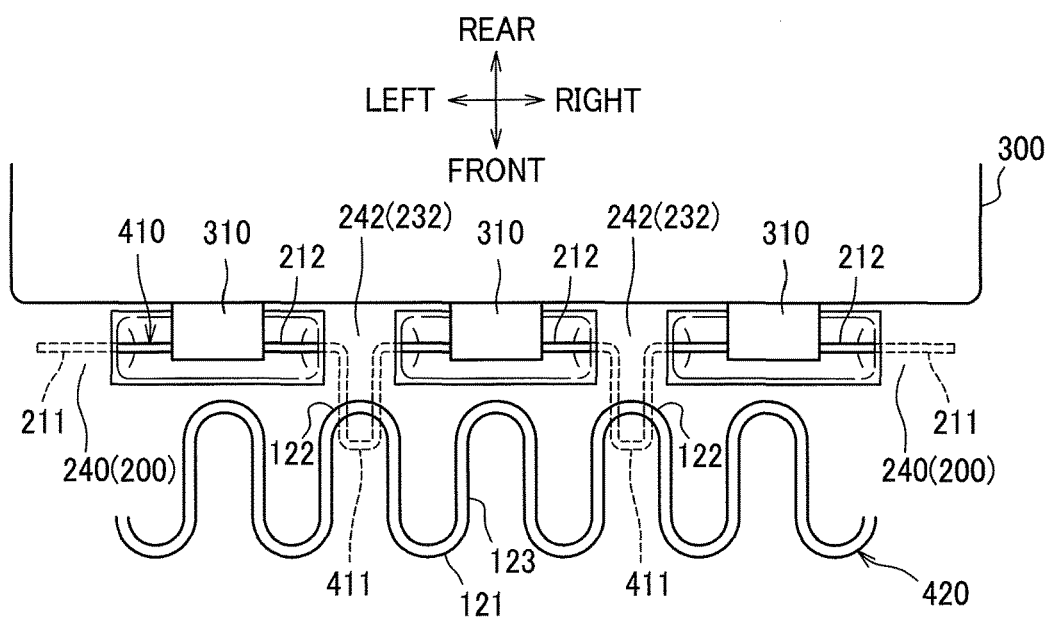
FIG. 10 is a bottom view of the skin attachment wire according to the first modified embodiment as viewed from the bottom side.
Figure 11:
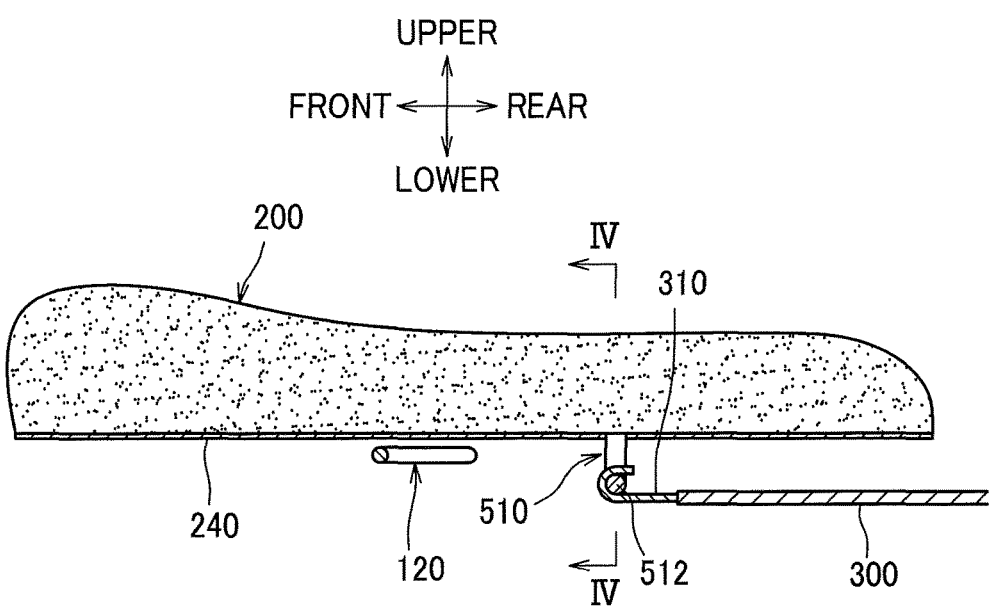
FIG. 11 includes (a) a sectional view of the skin attachment wire according to the second modified embodiment taken along the plane orthogonal to the lateral direction, and (b) a sectional view taken along the line IV-IV of FIG. 11(*a*).
Figure 11:
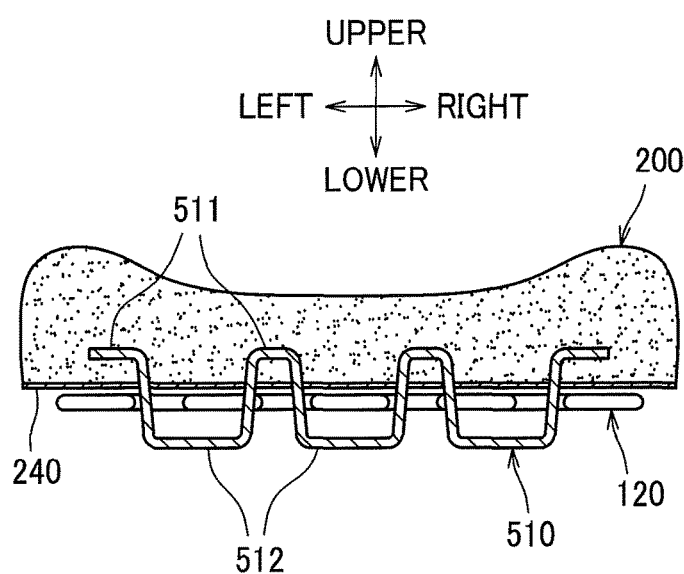

As seen in FIG. 10, the skin attachment wire 410 according to the first modified embodiment is different from that of the second embodiment in that each of the retention portions 411 corresponding to the middle portions 232 is formed to protrude frontward to form a U-shaped configuration. Further, the S-shaped spring 420 according to the first modified embodiment is disposed such that the two rear-side bent portions 122 among the plurality of rear-side bent portions 122 are located directly under the retention portions 411 and thus arranged in the same lateral positions as the middle portions 232.

With this configuration in which the S-shaped spring 420 is disposed directly under the retention portions 411 of the skin attachment wire 410, even if a local load is applied in the vicinity of the retention portion 411 of the skin attachment wire 410 of the seat cushion pad 200, the S-shaped spring 120 can suppress sinking of the skin attachment wire 410. Accordingly, it is possible to prevent the engagement portion 310 from coming off the skin attachment wire 410 due to sinking of the skin attachment wire 410.

[Second Modified Embodiment]

Next, a second modified embodiment will be described in detail with reference to the drawings where necessary. As the second modified embodiment is a modification of the structure in the vicinity of the skin attachment wire according to the above-described second embodiment, constituent elements similar to those previously described in the second embodiment are denoted by the same reference numerals and detailed description thereof will be omitted.

As seen in FIGS. 11(a) and (b), the skin attachment wire 510 according to the second modified embodiment is formed to have a plurality of turns made in the upper-lower direction; a part of the skin attachment wire 510 constitutes retention portions 511 embedded in the seat cushion pad 200, while the rest of the skin attachment wire 510 constitutes engaged portions 512 protruding downward from the lower surface of the seat cushion pad 200 (more specifically, the coarse blanket 240) and exposed outside. The engaged portions 512 are located at positions lower than the S-shaped spring 120 for supporting the seat cushion pad 200 from the lower side of the seat cushion pad 200.

With this configuration in which the engaged portions 512 are located at positions lower than the S-shaped spring 120, the attachment of the engagement portions 310 of the skin material 300 to the engaged portions 512 is easily performed. Accordingly, the work for attaching the skin material 300 can be eased further.

Although the second embodiment and the modified embodiments thereof have been described above, the present invention is not limited to these configurations and may be carried out into practice in various other ways, as will be described below.

In each of the above-described embodiments, the seat cushion pad 200 is exemplified as an example of a cushion pad. However, the present invention is not limited to this configuration, and a seat back pad may be employed as the cushion pad.

In each of the above-described embodiments, the skin attachment wire 210, 410, 510 is provided at the rear portion of the seat cushion pad 200. However, the present invention is not limited to this configuration; the skin attachment member may be provided at any position as long as it is provided at the reverse side of the cushion pad.

In each of the above-described embodiments, the wire (skin attachment wire 210 and the like) is exemplified as an example of the skin attachment wire. However, the present invention is not limited to this configuration; for example, a cylindrical pipe member or a polygonal-shaped rod-like member may be used.

In each of the above-described embodiments, the coarse blanket 240 is exemplified as an example of a sheet member. However, the present invention is not limited to this configuration; other fabric may be used as long as it is a sheet-like member.

In the above-described second embodiment, the plurality of recess portions 220 are arranged in line in the lateral direction. However, the present invention is not limited to this configuration; if the skin attachment member extends, for example, along a circular arc, the plurality of recess portions may be arranged in line along the circular arc. Further, the number of recess portions is not limited to the specific number as disclosed in the above-described embodiment, and any number of recess portions may be provided.

In the above-described second embodiment, the openings (exposure openings 241) are exemplified as an example of cutaway portions. However, the present invention is not limited to this configuration; for example, cutaway portions which open at an end portion of the sheet member may be provided.

In the above-described first modified embodiment, the retention portions 411 of the skin attachment wire 410 are modified so that the S-shaped spring 420 is disposed directly under the retention portions 411. However, the present invention is not limited to this configuration; for example, the shape of the S-shaped spring may be modified so that the S-shaped spring is disposed directly under the engaged portions of the skin attachment member.

In each of the above-described embodiments, the S-shaped spring 120 is exemplified as an example of an elastic member. However, the present invention is not limited to this configuration; for example, other wire springs and plate springs, and the like may be used. However, in the configuration utilizing the S-shaped spring, the seat cushion pad can be favorably supported, for example, as compared with the configuration in which a straight wire spring is employed.

In each of the above-described embodiments, the S-shaped spring 120 (elastic member) is formed to extend laterally. However, the present invention is not limited to this configuration; as long as the elastic member extends in a direction from one end to another end of the cushion pad, the elastic member may extend, for example, in the front-rear direction.

In the above-described embodiment, the car seat S used for an automobile is exemplified as an example of a vehicle seat. However, the present invention is not limited to the car seat, and may be applied to other vehicle seat, such as a seat for a ship or an aircraft.

<Third Embodiment>

With reference to FIGS. 12 to 16, the second embodiment of the present invention will be described below. Constituent elements similar to those previously described in the above-described first embodiment are denoted by the same reference numerals and detailed description thereof will be omitted.

Figure 12:
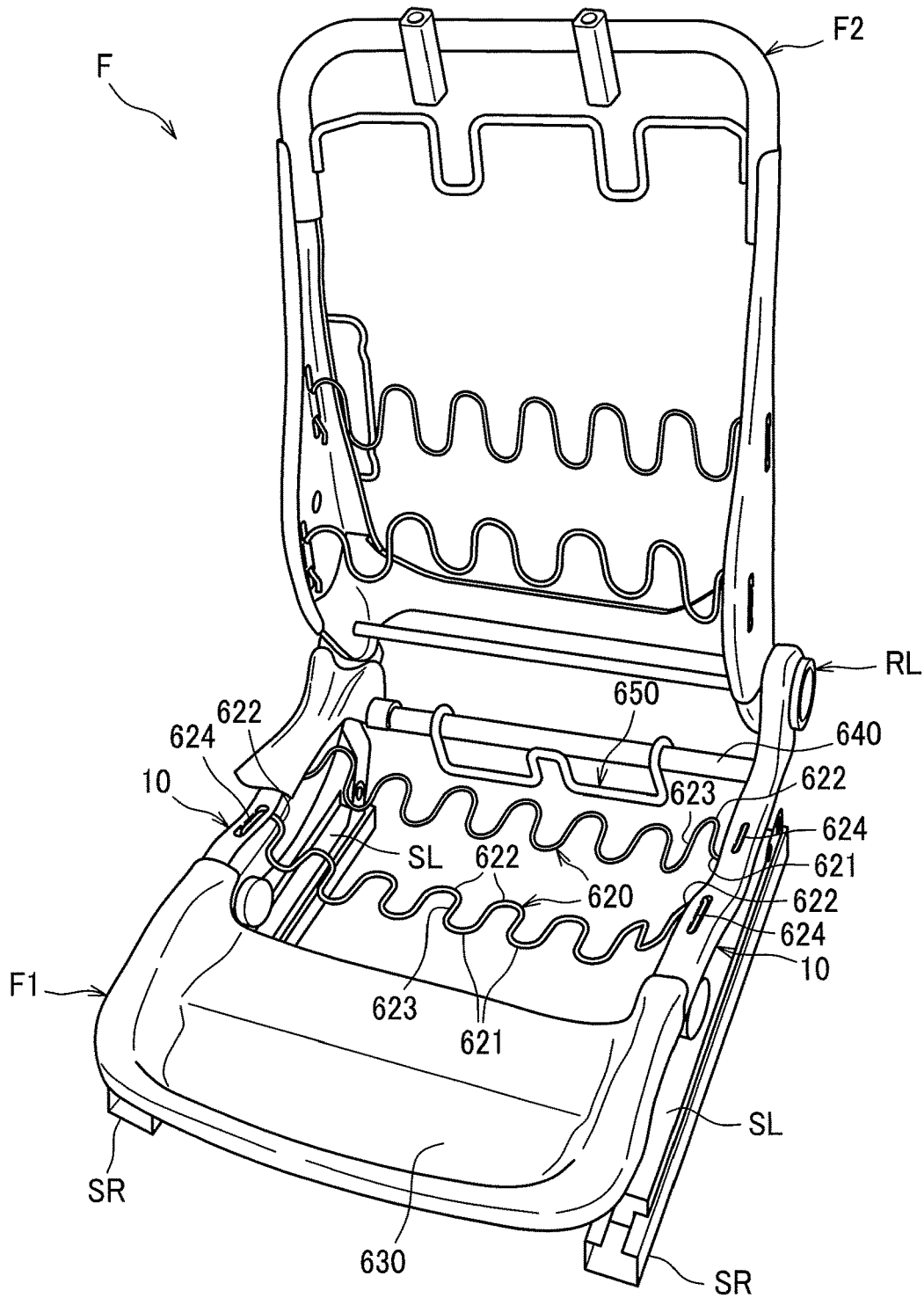
FIG. 12 is a perspective view of the seat frame embedded in the car seat according to the third embodiment of the present invention.
Figure 13:
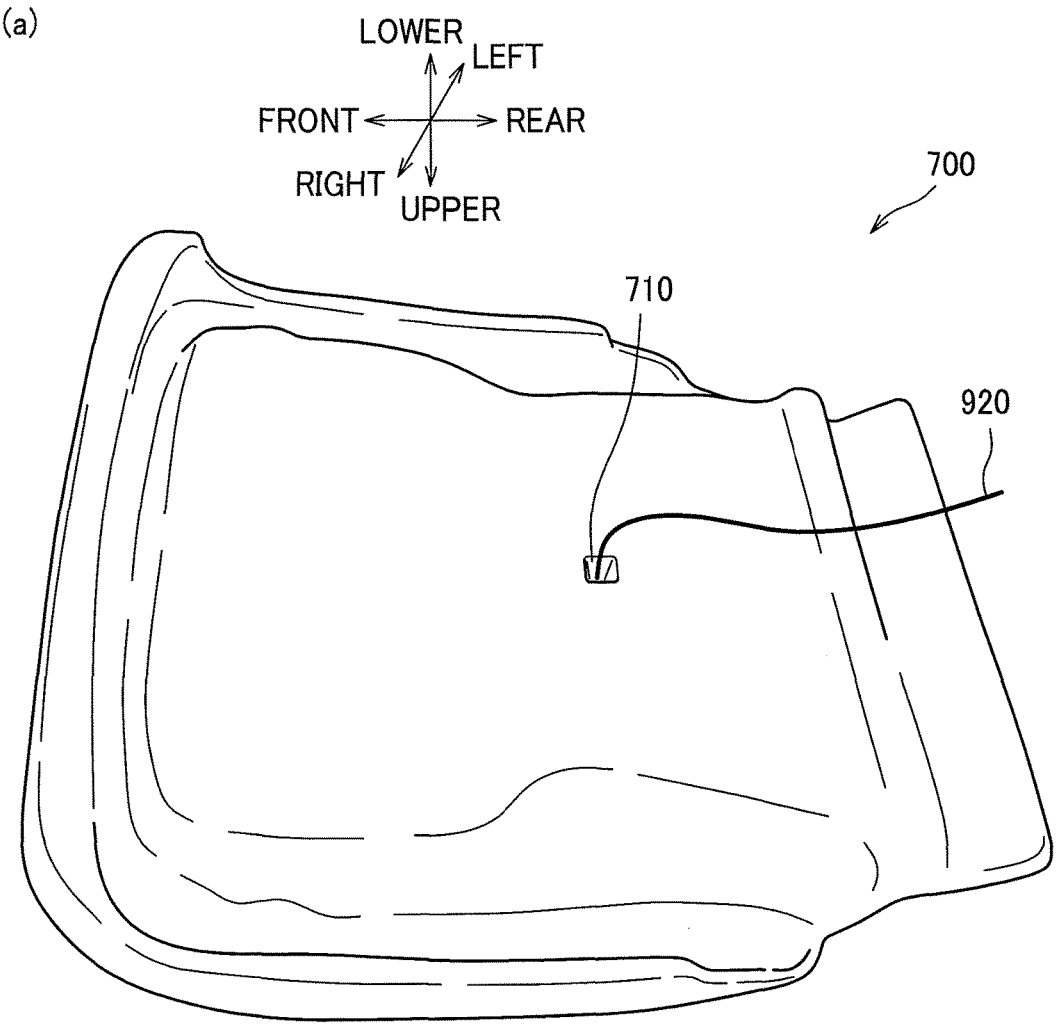
FIG. 13 includes (a) a perspective view of the seat cushion pad as viewed from the bottom side, and (b) a sectional view showing a portion around the through-opening.
Figure 13:
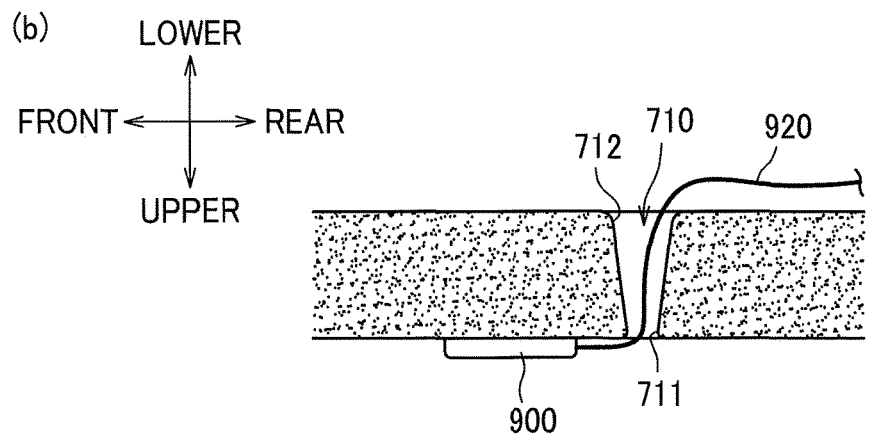

A seat frame F as shown in FIG. 12 is embedded in the seat cushion S1 (see FIG. 1) and the seat back S2 (see FIG. 1). The seat frame F mainly includes a seat cushion frame F1 constituting a frame of the seat cushion S1, and a seat back frame F2 constituting a frame of the seat back S2. The seat cushion S1 is configured such that the seat cushion frame F1 is covered with a seat cushion pad 700 (see FIG. 13) made of a cushion material such as urethane foam, and a skin material 800 (see FIG. 15) made of synthetic leather or fabric. The seat back S2 is configured such that the seat back frame F2 is covered with a seat back pad made of a cushion material, and a skin material made of synthetic leather or fabric.

A seat cushion frame F1 is a frame in the shape of an approximately rectangular configuration, and is installed on sliders SL; the sliders SL are respectively supported by a pair of right and left slide rails SR provided on a floor of an automobile so as to be slidable in the front-rear direction with respect to the slide rails SR. Accordingly, the position of the car seat S is adjustable in the front-rear direction.

A lower portion of the seat back frame F2 is rotatably connected to a rear portion of the seat cushion frame F1 via a reclining mechanism RL. Accordingly, the seat back S2 is tillable in the front-rear direction with respect to the seat cushion S1.

Next, the seat cushion frame F1 and the seat cushion pad 700 will be described in detail.

The seat cushion frame F1 mainly includes a pair of right and left side frames 10, two S-shaped springs 620 (as an example of an elastic member) run between the right and left side frames 10, a pan frame 630 connecting front portions of the side frames 10, and a connecting pipe 640 connecting rear end portions of the side frames 10.

The right and left side frames 10 are frames extending in the front-rear direction and made of metal: the right and left side frames 10 are laterally spaced apart from each other. The pan frame 630 is disposed at an approximately front-half portion between the right and left side frames 10, and the two S-shaped springs 620 are attached to an approximately rear-half portion between the right and left side frames 10 with these S-shaped springs 120 spaced apart from each other in the front-rear direction.

Each of the S-shaped springs 620 is a spring extending long in the lateral direction with a plurality of turns made in the front-rear direction (i.e., transverse direction of the S-shaped spring 620). To be more specific, the S-shaped spring 620 includes a plurality of front-side bent portions 621 each having an approximately circular arc configuration which protrudes frontward, a plurality of rear-side bent portions 622 each having an approximately circular arc configuration which protrudes rearward, a plurality of connecting portions 623 each having an approximately linear configuration and configured to connect the front-side bent portion 621 and the rear-side bent portion 622, and engagement portions 624 each formed at the outermost front-side bent portion 621 or the outermost rear-side bent portion 622 and configured to be engageable with the side frame 10.

The pan frame 630 is an approximately box-like member which opens upward and rearward.

The right and left side frames 10, the pan frame 630, and the two S-shaped springs 620 are covered with the seat cushion pad 700 as shown in FIG. 13(a). Accordingly, the seat cushion pad 700 is supported by the side frames 10, the pan frame 630, and the S-shaped springs 620 from the lower side of the seat cushion pad 700.

As seen in FIGS. 13(a) and 13(b), a through-opening 710 for inserting a harness member 920 of a seating sensor 900 is formed in an approximately center portion of the seat cushion pad 700 to pierce through the seat cushion pad 700 in the upper-lower direction; the seating sensor 900 is configured to detect an occupant seating on the seat cushion S1. The through-opening 710 is a rectangular-shaped opening with an upper-side opening 711 and a lower-side opening 712, and formed such that the lower-side opening 712 is larger than the upper-side opening 711.

With this configuration, for example, as compared with the configuration in which the through-opening is formed to extend vertically straight, the weight of the seat cushion pad 700 can be reduced for the amount corresponding to the extended lower-side portion of the through-opening 710. Further, since the upper-side opening 711 of the through-opening 710 is smaller, it is possible to reduce uncomfortable feeling experienced by the occupant when he/she sits on the seat cushion pad 700 and feels the presence of the through-opening 710, for example, as compared with the configuration in which the upper-side opening of the through-opening is enlarged to reduce the weight.

Figure 14:
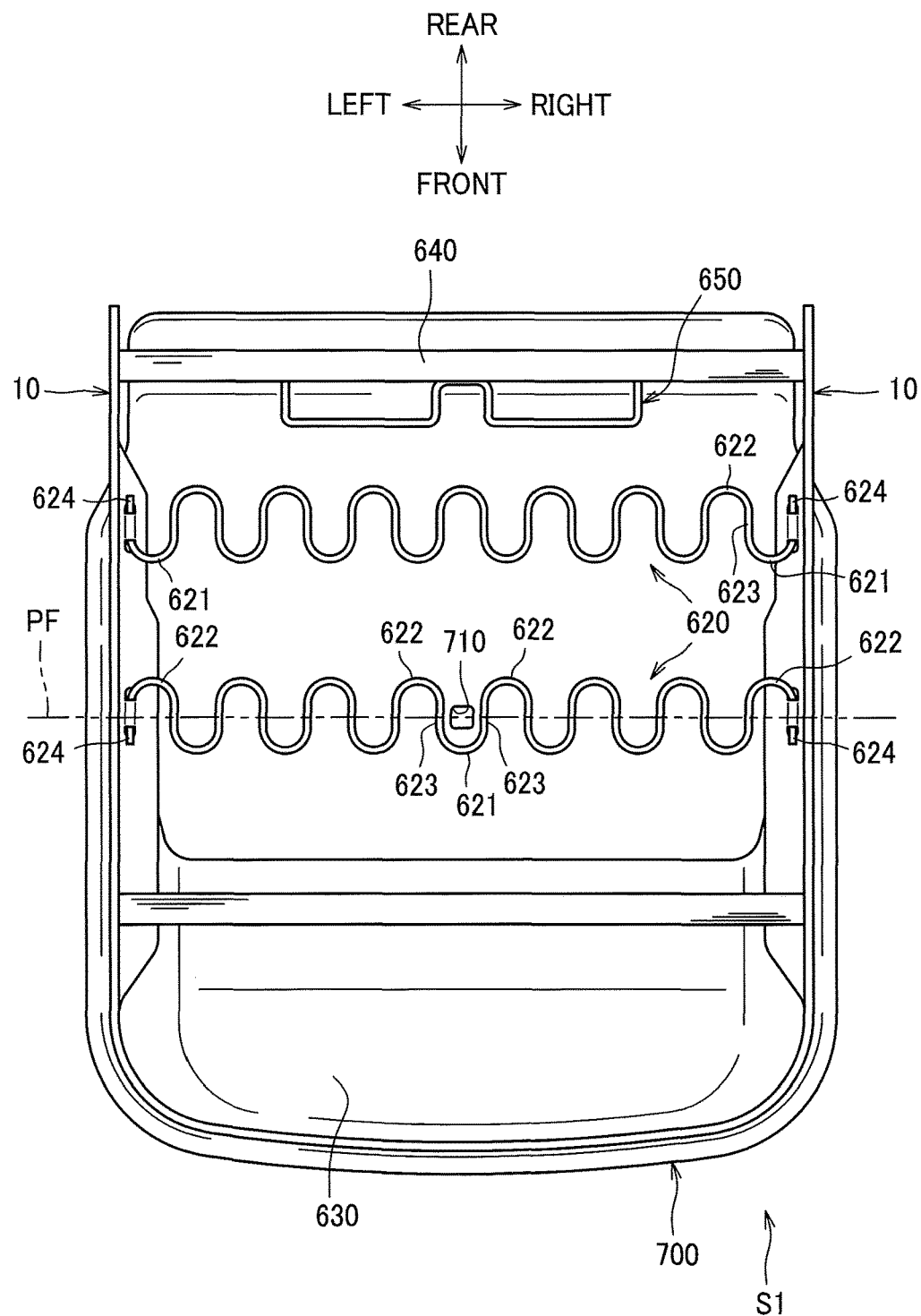
FIG. 14 is a bottom view of the S-shaped springs and the seat cushion pad as viewed from the bottom side.

As seen in FIG. 14, the through-opening 710 is disposed in the same position in the front-rear direction as the front-side S-shaped spring 620 among the two front and rear S-shaped springs 620. To be more specific, a portion of the through-opening 710 and a portion of the front-side S-shaped spring 620 are arranged in the same position in the front-rear direction (i.e., on one vertical plane PF extending in the lateral direction). In other words, the through-opening 710 and the front-side S-shaped spring 620 are arranged to intersect one vertical plane extending in the lateral direction (i.e., longitudinal direction of the S-shaped spring 620).

With this configuration, since a portion around the through-opening 710 is supported by the S-shaped spring 620, deformation of the through-opening 710 can be suppressed and a load applied to the harness member 920 can be reduced. Further, since the through-opening 710 is provided in the position corresponding to the front-side S-shaped spring 620, which is less likely to receive a load from the occupant than the rear-side S-shaped spring 620 where a large load is applied from the occupant, for example, as compared with the configuration in which the through-opening is provided in the position corresponding to the rear-side S-shaped spring, deformation of the through-opening 710 can be further suppressed and thus a load applied to the harness member 920 can be further reduced.

The through-opening 710 is disposed in a position not overlapping the S-shaped spring 620 as viewed from the lower side, more specifically, at a position between a pair of connecting portions 623 of the S-shaped spring 620. With this configuration, the work for inserting the harness member 920 into the through-opening 710 can be eased because the S-shaped spring 620 does not obstruct the work. Further, since the through-opening 710 and the S-shaped spring 620 do not overlap each other, interference between the harness member 920 and the S-shaped spring 620 can be suppressed.

The pair of connecting portions 623 are formed to extend along the peripheral edge of the rectangular-shaped through-opening 710 and adjacent to the through-opening 710. With this configuration, the portion around the through-opening 710 can be favorably supported by the connecting portions 623 of the S-shaped spring 620.

Further, a portion of the S-shaped spring 620 which surrounds the through-opening 710, namely, a recess-shaped portion formed by a front-side bent portion 621 and a pair of connecting portions 623 is formed to open rearward. With this configuration, since the portion of the S-shaped spring 620 which surrounds the through-opening 710 opens rearward, even if the through-opening 710 and the harness member 920 located in the through-opening 710 are pulled and moved rearward when the rear portion of the seat cushion pad 700 is deeply sunk by the load from the occupant, interference between the harness member 920 and the S-shaped spring 620 can be suppressed.

Figure 15:
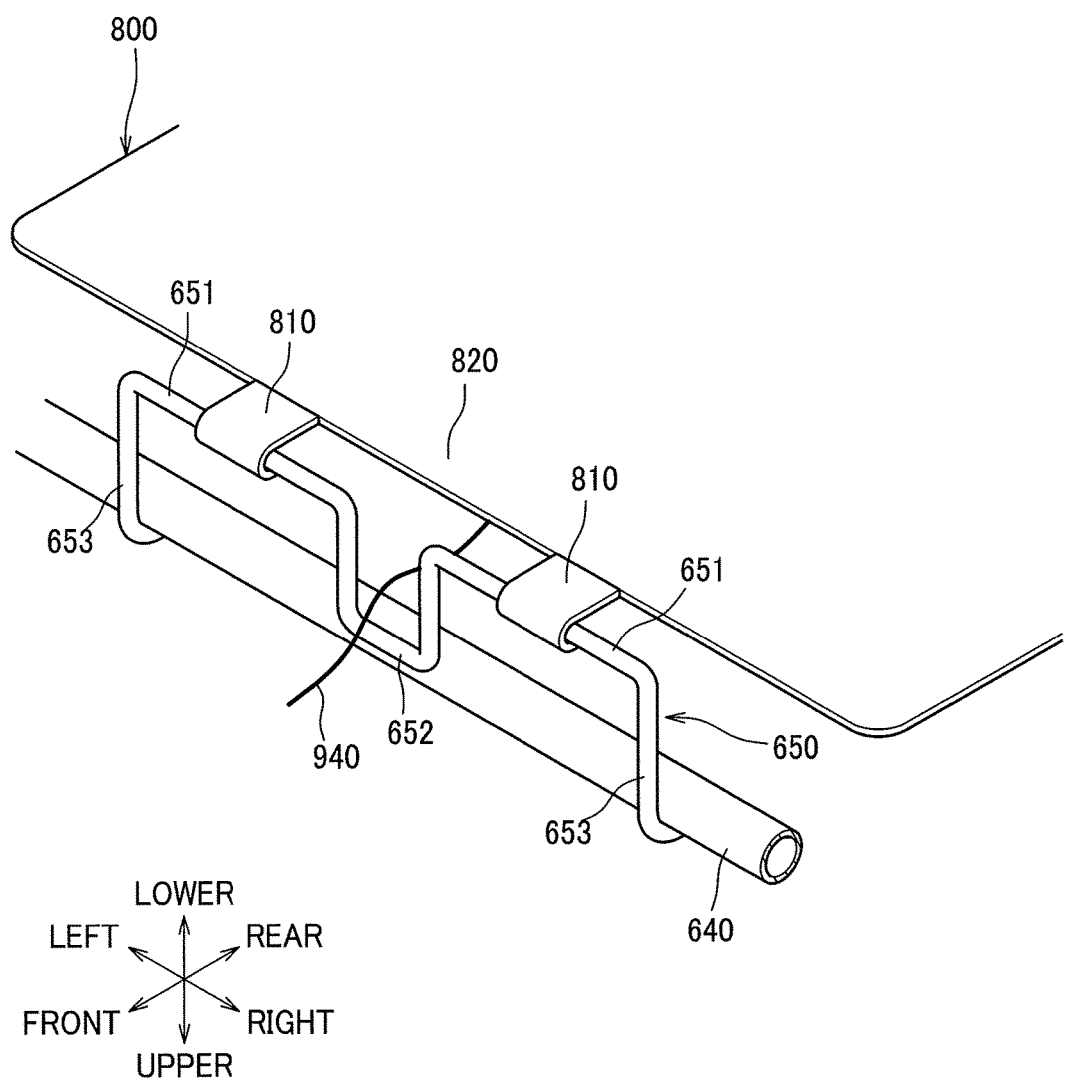
FIG. 15 is a perspective view of the skin attachment member and a skin material as viewed from the bottom side.

As seen in FIGS. 12 and 15, the connecting pipe 640 is a cylindrical pipe, and a skin attachment member 650 is fixed to an approximately center portion of the connecting pipe 640 by welding or the like. The skin attachment member 650 is made by bending a cylindrical columnar member made of metal, and mainly includes two engaged portions 651, a recess-shaped portion 652 provided between the engaged portions 651, and attachment portions 653 provided laterally outside the respective engaged portions 651.

The engaged portions 651 are rod-like portions extending in the lateral direction and located laterally spaced apart from each other at positions away from the connecting pipe 640. Two engagement portions 810 provided on the skin material 800 are respectively engaged with the engaged portions 651.

The recess-shaped portion 652 is formed to open downward (in a direction opposite to the connecting pipe 640), and both end portions of the recess-shaped portion 652 are respectively connected to a laterally inner end portion of the engaged portions 651.

The attachment portion 653 extends upward (toward the connecting pipe 640) from a laterally outer end portion of each of the engaged portions 651, and a distal end of the attachment portion 653 is bent along the peripheral surface of the connecting pipe 640.

Further, the recess-shaped portion 652 and the attachment portions 653 are fixed to the connecting pipe 640 by welding or the like. With this configuration, the skin attachment member 650 can be fixed firmly to the connecting pipe 640 at three portions, for example, as compared with the configuration in which both ends of a U-shaped skin attachment member is fixed to the connecting pipe (at two portions).

Disposed inside the recess-shaped portion 652 is a harness member 940 for a heater, for instance. For example, in a structure in which both ends of the U-shaped skin attachment member is fixed to the connecting pipe, it is necessary that the harness member be inserted between the skin attachment member and the connecting pipe, with the result that the wiring work for the harness member will be complicated. In contrast, if the center portion of the skin attachment member 650 is formed as the recess-shaped portion 652 according to this embodiment, the wiring work for the harness member 940 can be eased because the harness member 940 can be simply inserted to the inside (toward the connecting pipe 640) from an opening of the recess-shaped portion 652.

The two engagement portions 810 are located laterally spaced apart at the rear-side end portion of the skin material 800; the distal end of each of the engagement portions 810 is bent along the peripheral surface of the engaged portion 651 so as to be engageable with the engaged portion 651. The engagement portions 810 are also provided at other end portions of the skin material 800 where necessary. Further, a portion 820 of the skin material 800 which is located between the above-described two engagement portions 810 faces the harness member 940. With this configuration, the skin material 800 can prevent the occupant from touching the harness member 940.

Although the third embodiment has been described above, the present invention is not limited to this specific configuration and may be carried out into practice in various other ways, as will be described below.

Figure 16:
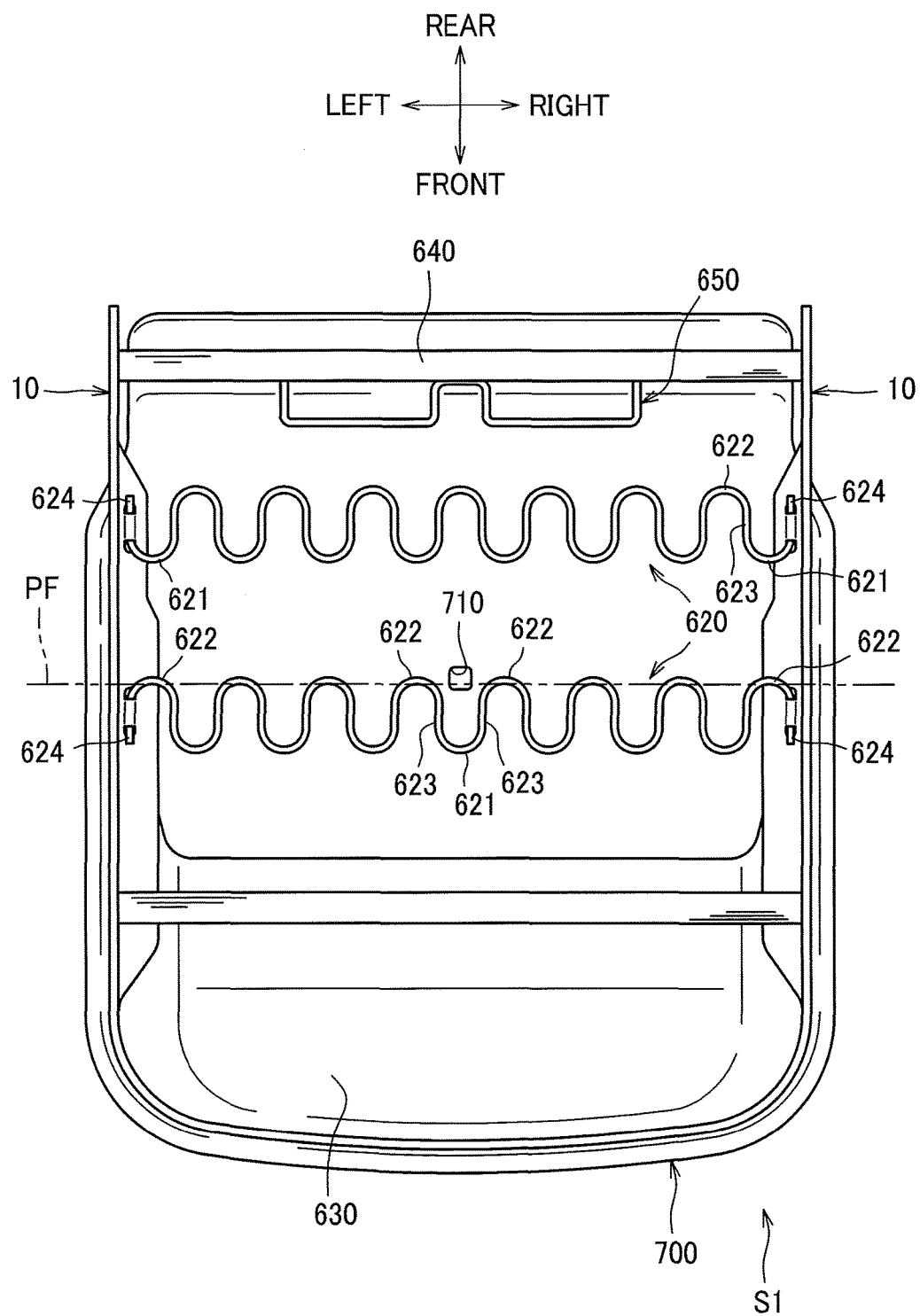
FIG. 16 is a bottom view showing an embodiment in which the through-opening is disposed in a position outside the width of the S-shaped spring in the front-rear direction.

In the above-described third embodiment, the through-opening 710 is disposed between the pair of connecting portions 623. However, the present invention is not limited to this configuration; for example, the through-opening 710 may be disposed in a space surrounded by a U-shaped front-side bent portion 621 or in a space between a pair of rear-side bent portions 622. Further, it is not necessary that the through-opening 710 be disposed within the width of the S-shaped spring 620 in the front-rear direction; for example, as seen in FIG. 16, the through-opening 710 may be disposed in a position outside the width of the S-shaped spring 620 in the front-rear direction. In other words, the through-opening 710 and the S-shaped spring 620 are arranged to intersect one vertical plane PF extending in the lateral direction.

In the above-described third embodiment, the S-shaped spring 620 (elastic member) is formed to extend laterally. However, the present invention is not limited to this configuration; as long as the elastic member extends in a direction from one end to another end of the seat cushion pad, the elastic member may extend in any direction, for example, in the front-rear direction.

In the above-described third embodiment, the through-opening 710 is formed as a rectangular-shaped opening. However, the present invention is not limited to this configuration; for example, the through-opening may be a circular opening or a polygonal opening other than the rectangular-shaped opening.

In the above-described third embodiment, the S-shaped spring 620 is exemplified as an example of an elastic member. However, the present invention is not limited to this configuration; for example, other wire springs and plate springs, and the like may be used. However, in the configuration utilizing the S-shaped spring, the seat cushion pad can be favorably supported, for example, as compared with the configuration in which a straight wire spring is employed.

In the above-described third embodiment, the car seat S used for an automobile is exemplified as an example of a vehicle seat. However, the present invention is not limited to the car seat, and may be applied to other vehicle seat, such as a seat for a ship or an aircraft.

The invention claimed is:

1. A vehicle seat comprising:
   a seat cushion having a seat cushion pad and a seat back having a seat back pad,
   wherein the seat cushion pad has an upper surface located to be closer to an occupant seated on the vehicle seat, and a bottom surface opposite to the upper surface,
   wherein the seat back pad has a front surface located to be closer to the occupant seated on the vehicle seat, and a rear surface opposite to the front surface,
   wherein one of the seat cushion pad and the seat back pad has a through-opening for inserting a harness member and is supported by an elastic member, the elastic member extending in a direction from one end to another end of the one of the seat cushion pad and the seat back pad and including longitudinal and transverse dimensions to support the one of the seat cushion pad and the seat back pad,
   wherein the elastic member is an S-shaped spring extending in a longitudinal direction and having a plurality of turns made in a transverse direction perpendicular to the longitudinal direction,
   wherein the S-shaped spring comprises a plurality of first bent portions arranged in the longitudinal direction, and a plurality of second bent portions arranged in the longitudinal direction and spaced apart from the first bent portions in the transverse direction,
   wherein at the upper surface of the seat cushion pad or at the front surface of the seat back pad, a size of the through-opening in the transverse direction is smaller than a size of the S-shaped spring in the transverse direction, and a size of the through-opening in the longitudinal direction is smaller than a size of each of the first bent portions in the longitudinal direction, and
   wherein the elastic member and the through-opening are arranged to intersect a plane extending in a longitudinal direction of the elastic member and perpendicular to a transverse direction of the elastic member; and
   a harness member,
   wherein the harness member is disposed to pass through the through-opening.

2. The vehicle seat according to claim 1, wherein a portion of the elastic member and a portion of the through-opening are arranged on the plane.

3. The vehicle seat according to claim 1, wherein the through-opening is disposed so as not to overlap the elastic member.

4. The vehicle seat according to claim 1, wherein the elastic member is formed to extend along a peripheral edge of the through-opening.

5. The vehicle seat according to claim 1, wherein the through-opening is a rectangular-shaped opening.

6. The vehicle seat according to claim 1, wherein the through-opening is disposed in a laterally central portion of the vehicle seat, and
   wherein the elastic member has end portions, a middle portion disposed between the end portions and extending in the longitudinal direction, and a pair of slanted portions each provided between the middle portion and one of the end portions, and
   wherein the middle portion is located lower than the end portions.

7. The vehicle seat according to claim 1, wherein the through-opening is formed in the seat cushion pad, and the seat cushion pad is supported by the elastic member, and
   wherein the through-opening is formed such that a lower-side thereof is larger than an upper-side thereof.

8. The vehicle seat according to claims 1, wherein the through-opening is formed in the seat cushion pad, and the seat cushion pad is supported by the elastic member.

9. The vehicle seat according to claims 1, wherein at least a portion of the through-opening is disposed within one of the plurality of turns.

10. The vehicle seat according to claims 1, wherein the through-opening is disposed within a width of the S-shaped spring in the transverse direction.

11. The vehicle seat according to claims 1, wherein the S-shaped spring is provided at plural positions, and
    wherein the through-opening is disposed between two S-shaped springs.

12. The vehicle seat according to claims 1, wherein the through-opening is formed in the seat cushion pad, and the seat cushion pad is supported by the elastic member,
    wherein the S-shaped spring is one of a pair of front-side and rear-side S-shaped springs extending laterally and provided spaced apart from each other in a front-rear direction,
    wherein the through-opening is provided in a position corresponding to the front-side S-shaped spring, and
    wherein a portion of the front-side S-shaped spring which is located to surround the through-opening opens rearward.

13. A vehicle seat comprising:
    a seat cushion;
    a seat back; and
    a seating sensor having a harness member,
    wherein the seat cushion comprises a seat cushion pad having a through-opening for inserting the harness member of the seating sensor, and
    an elastic member extending in a direction from one end to another end of the seat cushion pad and including longitudinal and transverse dimensions to support the seat cushion pad from a lower side of the seat cushion pad,
    wherein the seat cushion pad has an upper surface located to be closer to an occupant seated on the vehicle seat, and a bottom surface opposite to the upper surface,
    wherein the elastic member is an S-shaped spring extending in a longitudinal direction and having a plurality of turns made in a transverse direction perpendicular to the longitudinal direction,
    wherein the S-shaped spring comprises a plurality of first bent portions arranged in the longitudinal direction, and a plurality of second bent portions arranged in the longitudinal direction and spaced apart from the first bent portions in the transverse direction,
    wherein at the upper surface of the seat cushion pad, a size of the through-opening in the transverse direction is smaller than a size of the S-shaped spring in the transverse direction, and a size of the through-opening in the longitudinal direction is smaller than a size of each of the first bent portions in the longitudinal direction,
    wherein the elastic member and the through-opening are arranged to intersect one vertical plane extending in a longitudinal direction of the elastic member, and
    wherein the seating sensor is disposed such that the harness member thereof passes through the through-opening.

14. The vehicle seat according to claim 13, wherein a portion of the elastic member and a portion of the through-opening are arranged on the one vertical plane.

15. The vehicle seat according to claim 13, wherein the through-opening is disposed so as not to overlap the elastic member.

16. The vehicle seat according to claim 13, wherein an area of the through-opening at the upper surface of the seat cushion pad is smaller than an area of the through-opening at the bottom surface of the seat cushion pad.

17. A vehicle seat with a seat cushion and a seat back, the vehicle seat comprising:
- a seat cushion frame including right and left side frames and covered with a seat cushion pad;
- a seat back frame including right and left seat back side frames and covered with a seat back pad; and
- a seating sensor having a harness member,
- wherein the seat cushion pad has a through-opening for inserting the harness member of the seating sensor,
- wherein the seat cushion pad is supported by an elastic member, the elastic member extending from the right side frame to the left side frame of the seat cushion frame and including longitudinal and transverse dimensions to support the seat cushion pad from a lower side of the seat cushion pad,
- wherein the seat cushion pad has an upper surface located to be closer to an occupant seated on the vehicle seat, and a bottom surface opposite to the upper surface,
- wherein the elastic member is an S-shaped spring extending in a longitudinal direction and having a plurality of turns made in a transverse direction perpendicular to the longitudinal direction,
- wherein the S-shaped spring comprises a plurality of first bent portions arranged in the longitudinal direction, and a plurality of second bent portions arranged in the longitudinal direction and spaced apart from the first bent portions in the transverse direction,
- wherein at the upper surface of the seat cushion pad, a size of the through-opening in the transverse direction is smaller than a size of the S-shaped spring in the transverse direction, and a size of the through-opening in the longitudinal direction is smaller than a size of each of the first bent portions in the longitudinal direction,
- wherein the elastic member and the through-opening are arranged to intersect one vertical plane extending in a longitudinal direction of the elastic member, and
- wherein the seating sensor is disposed such that the harness member thereof passes through the through-opening.

18. The vehicle seat according to claim 17, further comprising a pan frame connecting front portions of the right and left side frames,
- wherein a portion of the elastic member and a portion of the through-opening are arranged on the one vertical plane, and
- wherein the elastic member and the through-opening are disposed so as not to overlap the pan frame.

19. The vehicle seat according to claim 17, further comprising a pan frame connecting front portions of the right and left side frames, wherein the through-opening is disposed so as not to overlap the elastic member, and
- wherein the elastic member and the through-opening are disposed so as not to overlap the pan frame.

20. The vehicle seat according to claim 17, wherein an area of the through-opening at the upper surface of the seat cushion pad is smaller than an area of the through-opening at the bottom surface of the seat cushion pad.

* * * * *